US008239706B1

(12) United States Patent
Yang

(10) Patent No.: US 8,239,706 B1
(45) Date of Patent: *Aug. 7, 2012

(54) DATA RETRIEVAL SYSTEM AND METHOD THAT PROVIDES RETRIEVAL OF DATA TO ANY POINT IN TIME

(75) Inventor: Qing K. Yang, Saunderstown, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 76 days.

This patent is subject to a terminal disclaimer.

(21) Appl. No.: 12/763,591

(22) Filed: Apr. 20, 2010

Related U.S. Application Data

(63) Continuation-in-part of application No. 11/749,901, filed on May 17, 2007, now Pat. No. 7,730,347.

(60) Provisional application No. 60/883,181, filed on Jan. 3, 2007.

(51) Int. Cl.
*G06F 11/00* (2006.01)
(52) U.S. Cl. .................. 714/6.24; 714/15; 714/20
(58) Field of Classification Search .................. 714/6.24, 714/15, 20
See application file for complete search history.

(56) References Cited

U.S. PATENT DOCUMENTS

| | | | |
|---|---|---|---|
| 5,341,381 A | | 8/1994 | Fuller |
| 5,526,482 A | | 6/1996 | Stallmo et al. |
| 5,574,882 A | * | 11/1996 | Menon et al. ................. 711/114 |
| 6,243,795 B1 | | 6/2001 | Yang et al. |
| 6,298,415 B1 | | 10/2001 | Riedle |
| 6,480,970 B1 | | 11/2002 | DeKoning et al. |
| 6,523,087 B2 | | 2/2003 | Busser |
| 6,799,284 B1 | * | 9/2004 | Patel et al. .................... 714/6.21 |
| 6,928,526 B1 | | 8/2005 | Zhu et al. |
| 8,001,344 B2 | * | 8/2011 | Uchida et al. ................. 711/162 |
| 2002/0059539 A1 | * | 5/2002 | Anderson .......................... 714/6 |
| 2004/0015373 A1 | * | 1/2004 | Silva-Craig et al. .............. 705/3 |
| 2005/0091556 A1 | * | 4/2005 | Frolund et al. .................... 714/2 |
| 2006/0036901 A1 | | 2/2006 | Yang et al. |
| 2006/0036904 A1 | * | 2/2006 | Yang ................................. 714/7 |
| 2008/0168304 A1 | * | 7/2008 | Flynn et al. ....................... 714/7 |
| 2008/0201608 A1 | * | 8/2008 | Forhan et al. ................... 714/15 |
| 2009/0077443 A1 | * | 3/2009 | Nguyen et al. ................ 714/747 |

OTHER PUBLICATIONS

Patterson, D.A. et al., "A case for redundant arrays of inexpensive disks (RAID)," In Proc. of the ACM SIGMOD International Conference on Management of Data, 1988, pp. 109-116.

(Continued)

*Primary Examiner* — Chae Ko
(74) *Attorney, Agent, or Firm* — Gesmer Updegrove LLP

(57) ABSTRACT

A method is disclosed of maintaining data. The method includes the steps of providing a plurality of data storage mediums, each comprising a parity bit that provides an indication of the parity of the data in each respective data storage medium, at least one of the data storage mediums providing an exclusive OR function of a parity output bit of the at least one of the plurality of data storage mediums; encoding data provided by the exclusive OR functionality of the parity output bit to provide encoded data; time stamping the encoded data with a time stamp circuit that is coupled to the encoded data to provide time stamped encoded data; and providing the time stamped encoded data to a time-retrieval data storage medium.

23 Claims, 10 Drawing Sheets

OTHER PUBLICATIONS

Blaum, M. et al., "EVENODD: An optimal scheme for tolerating double disk failures in RAID architectures," In Proc. of the 21st Annual International Symposium on Computer Architecture, Denver, CO, 1997.

Alvarez, G.A. et al., "Tolerating multiple failures in RAID architectures with optimal storage and uniform declustering," In Proc. of the 24th Annual International Symposium on Computer Architecture, Denver, CO. 1997.

Corbett, P. et al., "Row-Diagonal parity for double disk failure correction," In Proc. of the 3rd USENIX Conference on FAST, San Francisco, CA, Mar. 2004.

Patterson, D. et al., "Recovery oriented computing (ROC): Motivation, Definition, Techniques, and Case Studies," Computer Science Technical Report UCB/CSD-021175, U.C. Berkeley, Mar. 15, 2002.

Keeton, K. et al., "Designing for disasters," In Proc. of 3rd Conference on File and Storage Technologies, San Francisco, CA, 2004.

Morrey III, C.B. et al., "Peabody: The time traveling disk," In Proc. of IEEE Mass Storage Conference, San Diego, CA Apr. 2003.

Cox, L.P. et al., "Pastiche: making backup cheap and easy," In Proc. of the 5th USENIX Symposium on Operating System Design and Implementation, Boston, MA, Dec. 2002.

Lee, E.K. et al., "Petal: Distributed virtual disks," In Proc. of the 7th International Conference on Architecture Support for Programming Languages and Operating Systems (ASPLOS-7), Cambridge, MA, 1996.

Kistler, J.J. et al., "Disconnected operation in the Coda file system," In Proc. of 13th ACM Symposium on Operating System Principles, Pacific Grove, CA, Oct. 1991.

Hutchinson, N.C. et al., "Logical vs. Physical file system backup," In Proc. of 3rd Symposium on Operating System Design and Implementation, New Orleans, LA, Feb. 1999, pp. 239-250.

Quinlan, S. et al., "Venti: a new approach to archival storage," In Proc. of the 2002 Conference on File and Storage Technologies, Monterey, CA, Jan. 2002, pp. 89-101.

Santry, D.S. et al., "Deciding when to forget in the Elephant file system," In Prov. of 17th ACM Symposium on Operating System Principles, Charleston, SC, Dec. 1999, pp. 110-123.

Sankaran, A. et al., "Volume Shadow Copy Service," www.dell.com/powersolutions, Mar. 2004.

Hitz, D. et al., "File system design for an NFS file server appliance," In Proc. of the USENIX Winter Technical Conference, San Francisco, CA, 1994, pp. 235-245.

Xiao, W. et al., "Implementation and Performance Evaluation of Two Snapshot Methods on iSCSI Target Storages," In Proc. of NASA/IEEE Conference on Mass Storage Systems and Technologies, May 2006.

Gibston, G.A. et al., "Network Attached Storage Architecture," Communications of the ACM, vol. 43, No. 11, Nov. 2000, pp. 37-45.

Soules, C.A.N. et al., "Metadata efficiency in versioning file systems," In Proc. of the 2nd USENIX Conference on File and Storage Technologies, San Francisco, CA, Mar. 2003, pp. 43-58.

Rhea et al., "Pond: The OceanStore prototype," In Proc. of the 2dn USENIX Conference on File and Storage Technologies (FAST), San Francisco, CA, Mar. 2003.

Muthitacharoen, A. et al., "A low-bandwidth network file system," In Proc. of the Eighteenth ACM Symposium on Operating Systems Principles, Alberta, Canada, Oct. 2001.

Muniswamy-Reddy, K. et al., "A versatile and user-oriented versioning file system," In Proc. of the 3rd USENIX Conference on File and Storage Technologies, San Francisco, CA, 2004.

Sivathanu, M. [ et al., "A Logic of File Systems," In Proc. of 4th USENIX Conference on File systems and Storage Technologies, 2005.

Hu, Y. et al., "DCD—Disk Caching Disk: A New Approach for Boosting I/O Peformance," In 23rd Annual International Symposium on Computer Architecture (ISCA), Philadelphia, PA, May 1996.

Cain, H.W. et al., "An Architectural Evaluation of Java TPC-W," HPCA 2001, Nuevo Leone, Mexico, Jan. 2001.

Smith, D.M., "The Cost of Lost Data," Graziadio Business Report, Pepperdine University, 2003, vol. 06, Issue 3, pp. 1-7.

Peterson, Z. et al., "Ext3cow: A Time-Shifting File System for Regulatory Compliance," ACM Transactions on Storage, vol. 1, No. 2, pp. 1-21, 2005.

Ji, M. et al., "Seneca: Remote Mirroring Done Write," In Proc. of the 2003 USENIX Technical Conference, San Antonio, TX, Jun. 2003, pp. 253-268.

\* cited by examiner

DATA RETRIEVAL SYSTEM AND METHOD THAT PROVIDES RETRIEVAL OF DATA TO ANY POINT IN TIME

PRIORITY

This application is a continuation-in-part application of U.S. patent application Ser. No. 11/749,901 filed May 17, 2007, which claims priority to U.S. Provisional Patent Application Ser. No. 60/883,181 filed Jan. 3, 2007.

GOVERNMENT RIGHTS NOTICE

The present invention was made, at least in part, with support from the United States government under Grant (Contract) Number, CCR-0312613, awarded by the National Science Foundation. The United States government has certain rights to this invention.

BACKGROUND

The invention generally relates to the field of redundant data storage systems, and relates in particular to data storage systems and architectures that provide data retrieval to earlier points in time.

Data retrieval to prior points in time is required in myriad contexts including, for example data recovery due to information system failures, as well as data retrieval for record keeping purposes such as for data retrieval in distributed electronic healthcare information systems, electronic news information record keeping systems, and Internet information record keeping systems.

Data may be stored in a variety of data storage mediums, including for example, disk array architecture systems. A conventional disk array system architecture is known as the RAID system architecture that includes a redundant array of independent/inexpensive disks (RAID). The RAID system architecture provides a large amount of data storage in a reasonably reliable manner. U.S. Pat. No. 5,526,482 briefly discusses several RAID architectures.

In general, each of the RAID system architectures includes a plurality of disks that are controlled by a disk controller. When a central processing unit (CPU) sends information to the disk controller for storage on disk, the controller directs how the information shall be stored on the plurality of disks to ensure that a recovery request of any one of the disks will not cause the system to lose information. RAID-1 provides 2N data redundancy to protect data while RAID-3 through RAID-5 store data in parity stripes across multiple disks to improve space efficiency and performance over RAID-1. The parity of a stripe is the Exclusive-OR (XOR) of all data elements in the stripe. If data from a disk at time $t_0$ is needed, and the system requests such data at time $t_1$, the data in the disk can be retrieved by doing the XOR among the good disks, which may finish at $t_2$. The recovered data is exactly the same image of the data as it was at time $t_0$. Further conventional RAID architecture systems seek to retrieve data from more than one disk.

Traditional techniques for protecting data from the above failures are mainly periodical (daily or weekly) backups and snapshots. These techniques usually require a significant amount of time to retrieve data. In addition, data between backups is vulnerable to data loss.

Retrieval of data is generally measured by two key parameters: recovery point objective (RPO) and recovery time objective (RTO). RPO measures the maximum acceptable age of data at the time of outage. For example, if an outage occurs at time $t_0$, and the system found the outage at time $t_1$, the ideal case is to recover data as it was right before $t_0$, or as close to $t_0$ as possible. A daily backup would represent RPO of approximately 24 hours because the worst-case scenario would be an outage during the backup, i.e., $t_0$ is the time point when a backup is just started. RTO is the maximum acceptable length of time to resume normal data processing operations after an outage. RTO represents how long it takes to recover data. For the above example, if data is successfully recovered at time $t_2$ after starting the recovery process at 6, then the RTO is $t_2-t_1$. Depending on the different values of RPO and RTO, there exist different storage architectures capable of recovering data upon an outage.

Data protection and retrieval have traditionally been done using periodic backups and snapshots. Backups are typically done nightly when data storage is not being used since the process is time consuming and degrades application performance. During the backup process, user data is transferred to a tape, a virtual tape, or a disk for disk-to-disk backup. Full backups may be performed weekly or monthly with daily incremental backups occurring between the full backups.

Data compression is often used to reduce backup storage space. A snapshot is a point-in-time image of a collection of data allowing on-line backup. A full-copy snapshot creates a copy of the entire data as a read only snapshot storage clone. To save space, copy-on-write snapshot copies a data block from the primary storage to the snapshot storage upon the first write to the block after the snapshot was created. A snapshot may also redirect all writes to the snapshot storage after the snapshot was created. Such data back-up systems, however, remain costly and highly intrusive batch operations that are prone to error and consume an exorbitant amount of time and resources.

Besides periodic data backups, data may also be protected at file system level using file versioning that records a history of changes to files. Typically, users need to create versions manually in these systems. There are also copy-on-write versioning systems that have automatic versions for some file operations. File versioning provides a time-shifting file system that allows a system to recover to a previous version of files. These versioning file systems have controllable RTO and RPO, but they are generally file system dependent and may not be directly applicable to enterprise data centers that use different file systems and databases. File versioning differs from periodic backups and snapshots in that file versioning works mainly at file system level not at block device level. Block level storages usually provide high performance and efficiency especially for applications such as databases that access raw devices.

To provide timely retrieval to any point-in-time at block device level, a log of changed data for each data block may be maintained in a time sequence. In the storage industry, this type of storage is usually referred to as CDP (Continuous Data Protection) storage. In such systems, a write operation will replace the old data in the same logic block address (LBA) to another disk storage instead of overwriting it. As a result, successive writes to the same LBA will generate a sequence of different versions of the block with associated timestamps indicating the time of the corresponding write operations. These replaced data blocks are stored in a log structure, maintaining a history of the data blocks that have been modified. Since every change on a block is kept, it is possible to view a storage volume as it existed at any point in time, dramatically reducing RPO. The RTO depends on the size of the storage for the logs, indexing structure, and consistency checks. The data image at the time of an outage is considered to be crash consistent at block level because the orders of all write operations are strictly preserved. A significant drawback of the CDP storage however, is the large amount of storage space required, which has thus far prevented it from being widely adopted.

Systems for providing data retrieval for record keeping purposes, typically require large volumes of storage to enable retrieval of data to a prior point in time. In electronic healthcare information systems, for example, patient data files stored in a distributed environment allowing healthcare providers at different locations to share and easily access a variety of electronic health records (EHR). As the use of such systems increases, a reliable, secure, and efficient data storage infrastructure is critical to future healthcare systems. There exist several technical challenges however, to increasing the size and usability of such systems, including reliability, security, and adequate online performance, that make the design and implementation of such distributed data storage systems difficult.

The first technical challenge regarding data reliability has to do with the importance of having EHR data available to authorized healthcare providers once they have been created and recorded for a patient. Such EHR should not only be playable (viewable) in real time but also should be re-playable (reviewable) as it was at any point-in-time in the past. Replay/review of the history of patient data is necessary because of requirements of medical audit, law suits, quality control and self-assessment. The requirement of being able to replay EHR data makes the design of the electronic Healthcare (eHealthcare) information system challenging because of the fundamental differences between paper records and electronic records. With paper records, one can easily review the history by following the paper trails of the records. With electronic records, on the other hand, existing data storage designs do not have the paper trails; any change to a piece of data in the data storage is destructive if a data write operation overwrites/destroys previous data in the same file or record. For example, any time when one saves or writes a changed word document or a spreadsheet file, the previous version of the file is overwritten and replaced. Similarly, a database transaction will also overwrite previous record of the same table. Even the meta data that records the time of last change or last access are also changed in a destructive way.

Realizing the importance of replaying history data, there has been extensive research in data storage and database systems in terms of data protection and recovery, file versioning, and database testing. Data protection and recovery technologies periodically make backups or snapshots of data so that data can be recovered to a point-in-time in the past in case of failures or disastrous events. The granularity of backups/snapshots varies depending on the reliability requirement and cost.

As mentioned above, continuous data protection (CDP) makes a copy of old data upon each write operation. CDP provides the finest granularity for data recovery at the cost of huge amount of data storage that is several orders of magnitude larger than the amount of normal real time data. File versioning systems keep different versions of files when file changes occur. The number of versions and the frequency of making file versions can be specified by users. In addition to the negative performance impacts, file versioning is file system dependent and requires users to be familiar with the file system. Database replays were originally designed for the purpose of database testing of production database systems that need upgrade or changes. By storing real transactions happening in production systems in a separate storage system, database replay makes testing of new database installation more realistic. Again, such database replays require users to explicitly define when and for how long to capture transactions in the production system. The major issue is that it is practically infeasible to enable SQL tracing on the entire database system because of high overheads.

The second technical challenge is data security and privacy of EHR system. Because data in an EHR are stored and transmitted in a distributed environment over a network, data encryption and access authentication are very important to protect privacy of patient data. As is well known, data encryption and decryption are very time consuming process especially for large amount of patient data. Supporting replay of EHR data aggregates this problem even further because the amount of data transmitted and stored to enable data replay is several orders of magnitude larger than production data due to repetitive overwrites. As a result, online performance of such EHR system will be dragged down dramatically by storage systems supporting data replay and data security.

There is a need, therefore, for an improved redundant data storage system, and in particular, for a system architecture for retrieving data at time $t_2$ to the data image of $t_0$ after it is determined at time $t_1$ that data needs to be retrieved to time $t_0$.

SUMMARY

In accordance with an embodiment, the invention provides a method of maintaining data that includes the steps of providing a plurality of data storage mediums, each comprising a parity bit that provides an indication of the parity of the data in each respective data storage medium, at least one of the data storage mediums providing an exclusive OR function of a parity output bit of the at least one of the plurality of data storage mediums, encoding data provided by the exclusive OR functionality of the parity output bit to provide encoded data, time stamping said encoded data with a time stamp circuit that is coupled to the encoded data to provide time stamped encoded data, and providing the time stamped encoded data to a time-retrieval data storage medium. In certain embodiments, the method provides data recovery in the event of data storage failure, and in other embodiments, the method provides data retrieval in a distributed information system.

In accordance with another embodiment, the invention provides a storage architecture for maintaining data. The storage architecture includes a plurality of data storage mediums, an encoder system and a time stamp circuit. The plurality of data storage mediums each include a parity bit that provides an indication of the parity of the data in each respective data storage medium. At least one of the data storage mediums provides an exclusive OR function of a parity output bit of the at least one of the plurality of data storage mediums. The encoder system is for encoding data provided by the exclusive OR functionality of the parity output bit to provide encoded data. The time stamp circuit is coupled to the encoded data for time stamping the encoded data to provide time stamped encoded data.

In accordance with a further embodiment, the invention provides a system for maintaining data at prior points in time for later data retrieval. The system includes a plurality of data storage mediums, a time-retrieval medium, and an encoder system. The plurality of data storage mediums each include a parity output bit that provides an indication of the parity of the data in each respective data storage medium. The time-retrieval medium is in communication with at least one of the data storage mediums. The encoder system is coupled to the parity output bit of at least one of the data storage mediums and is coupled to the time-retrieval medium for providing encoded data regarding whether a block of data in the at least one data storage medium has been changed.

BRIEF DESCRIPTION OF THE DRAWINGS

The following description may be further understood with reference to the accompanying drawings in which.

Figure 1:
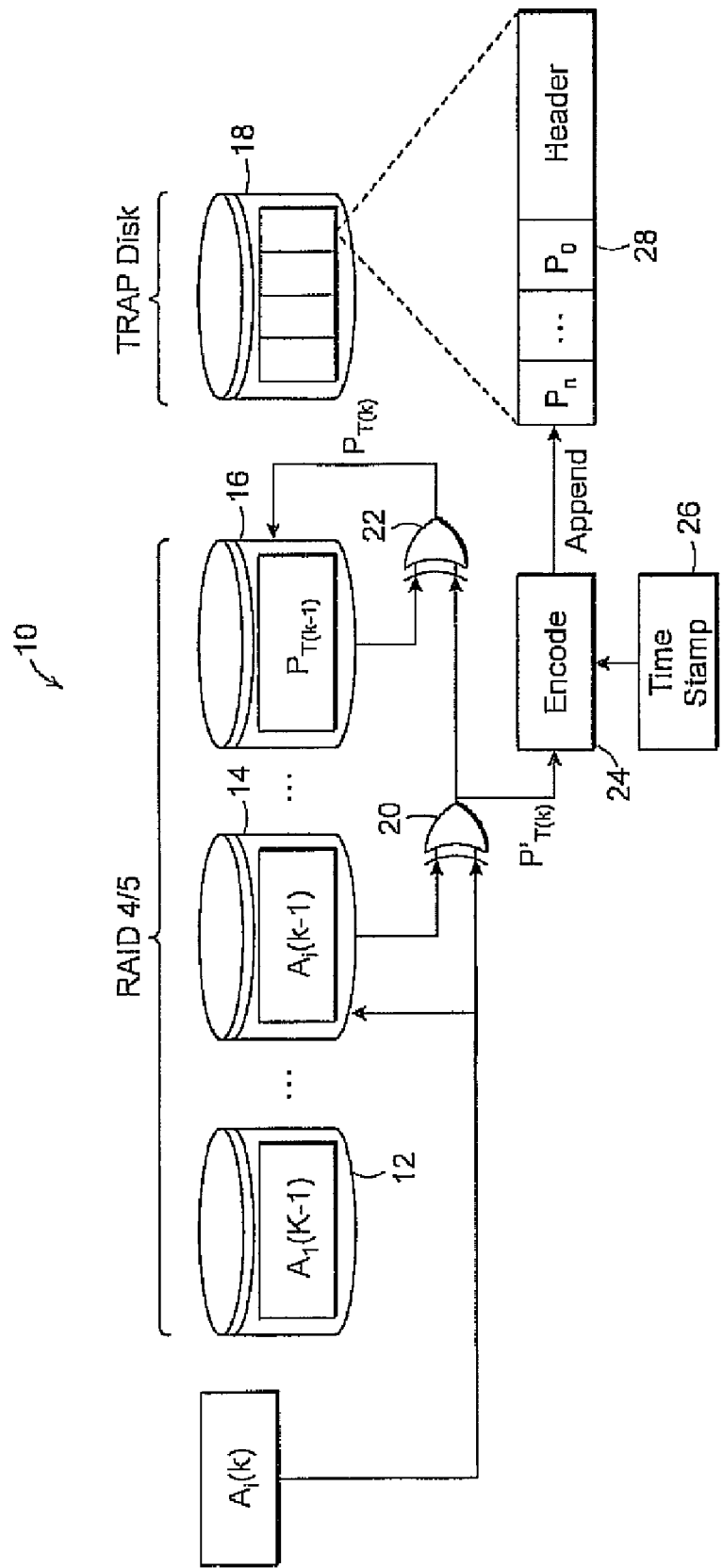
FIG. 1 shows an illustrative diagrammatic operational view of a block diagram of a system in accordance with an embodiment of the invention.

The drawings are shown for illustrative purposes only.

DETAILED DESCRIPTION

The invention generally provides a method of maintaining data that includes the steps of providing a plurality of data storage mediums, each comprising a parity bit that provides an indication of the parity of the data in each respective data storage medium, at least one of the data storage mediums providing an exclusive OR function of a parity output bit of the at least one of the plurality of data storage mediums. The method also includes the steps of encoding data provided by the exclusive OR functionality of the parity output bit to provide encoded data, time stamping said encoded data with a time stamp circuit that is coupled to the encoded data to provide time stamped encoded data, and providing the time stamped encoded data to a time-retrieval data storage medium.

In accordance with an embodiment, the method includes the step of retrieving data of interest in a data recovery system, and in further embodiments, the method includes the step of retrieving data of interest in an electronic information system such as a distributed electronic healthcare (eHealthcare) information system.

Data Recovery Systems

A data recovery system, for example, may include a disk array architecture that provides timely recovery to any point-in-time, referred to as TRAP-Array. A system that reduces the amount of data to be stored and transferred in a networked storage system, for example, is disclosed in U.S. Published Patent Application No. 2006/0036901, the disclosure of which is hereby incorporated by reference. TRAP-Array stores not only the data stripe upon a write to the array, but also the time-stamped Exclusive-ORs of successive writes to each data block. By leveraging the Exclusive-OR operations that are performed upon each block write in conventional RAID-4 and RAID-5 controllers, TRAP does not incur noticeable performance overhead. More importantly, TRAP is able to recover data very quickly to any point-in-time upon data damage by tracing back the sequence and history of Exclusive-ORs resulting from writes. The TRAP architecture is space-efficient.

A prototype TRAP architecture has been implemented using software at block device level and extensive performance measurements have been carried out using TPC-C benchmark running on Oracle databases (sold by Oracle International Corporation of Redwood City, Calif.) and PostgreSQL databases (sold by Sun Mircosystems, Inc. of Santa Clara, Calif.), TPC-W running on MySQL database (sold by MySQL of MySQL AB of Sweeden), and file system benchmarks running on Linux systems (sold by Linux Networx, Inc. of Bluffdale, Utah) and Windows systems (sold by Microsoft Corporation of Redmond Wash.). Experiments have demonstrated that TRAP is not only able to recover data to any point-in-time very quickly upon a failure but it also uses less storage space than traditional daily differential backup/snapshot. Compared to the state-of-the-art continuous data protection technologies, TRAP saves disk storage space by one to two orders of magnitude with a simple and a fast encoding algorithm. From an architecture point of view, TRAP-Array opens up another dimension for storage arrays. It is orthogonal and complementary to RAID in the sense that RAID protects data in the dimension along an array of physical disks while TRAP protects data in the dimension along the time sequence.

The idea of the TRAP architecture generally involves computing XORs among changed data blocks along the time dimension to improve performance and space efficiency, rather than providing full redundancy of data in time dimension, i.e., keeping a log of all previous versions of changed data blocks in time sequence. With a direct and fast encoding scheme, the TRAP architecture presents dramatic space savings because of content locality that exists in real world applications. Furthermore, it provides faster data recovery to any-point-in-time than traditional techniques because of the drastically smaller amount of storage space used.

A prototype of the new TRAP architecture was implemented at block device level using standard iSCSI protocol. The prototype is a software module inside an iSCSI target mountable by any iSCSI compatible initiator. The TRAP prototype was installed on PC-based storage servers as a block level device driver and experimental performance evaluation as compared to traditional data recovery techniques was conducted. Measurement results show up to 2 orders of magnitude improvements of the new TRAP architecture over existing technologies in terms of storage space efficiency. Such orders of magnitude improvements are practically important given the exponential growth of data.

Data recovery experiments were carried our by selecting any point-in-time in the past and recovering data to the time point. Experiments have shown that all recovery attempts were successful. Recovery time of the new TRAP architecture is compared with existing reliable storage architectures to show that the new TRAP architecture can recover data to any point-in-time very quickly. Again, instead of keeping all versions of a data block as it is being changed by write operations, TRAP systems of the invention keep a log of parities as a result of each write on the block.

FIG. 1 shows the basic design of an operational view of a system of the invention. As shown in FIG. 1, such a system 10 includes a plurality of data storage disks 12, 14, 16 in a redundant array of inexpensive discs (RAID) system such as a RAID-4 or RAID-5 system as discussed above. The system also includes a TRAP disk 18 and a plurality of bit-wise exclusive OR functionality components 20, 22 that are coupled to the RAID disks. Suppose that at time T(k), the host writes into a data block with logic block address A as shown that belongs to a data stripe (A1, A2 ... Ai, ... An). The RAID controller including disks 14, 16 and 18 performs the following operation to update its parity disk:

$$P_{T(k)} = A_i(k) \oplus A_i(k-1) \oplus P_{T(k-1)} \qquad (1)$$

where PT(k) is the new parity for the corresponding stripe, $A_i(k)$ (shown at 29) is the new data for data block $A_i$, $A_i(k-1)$ is the old data of data block $A_i$, and PT(k−1) is the old parity of the stripe.

Leveraging this computation, the system appends the first part of the above equation, i.e., P'T(k)=$A_i(k) \oplus A_i(k-1)$, to the parity log stored in the TRAP disk after an encoding circuit 24 that is coupled to a time stamp circuit 26 as shown in FIG. 1. The encoding may be implemented in either hardware or software, and may provide run-length encoding or any type of compression algorithm. A time stamp is provided to each block of encoded data $P_n$, and each block of encoded data $P_i$, has a variable length that depends on, for example, the number of non-zero bits encountered in the $A_i$. The appended blocks of data $P_n$ include a header, and together form a parity log 28 that is stored in the TRAP disk 18. In further embodiments, further disks $A_{i-n}$ or $A_{i+n}$ may also include encoder and time stamp circuits coupled to the parity output bit of each disk for generating parity log data that is stored in a TRAP disk.

Experiments have demonstrated a very strong content locality that exists in real world applications. For the workloads studied, only 5% to 20% of bits inside a data block actually change on a write operation. The parity, P'T(k), reflects the exact changes at bit level of the new write operation on the existing block. As a result, this parity block contains mostly zeros with a very small portion of bit stream that is nonzero. Therefore, it can be easily encoded to a small size parity block to be appended to the parity log reducing the amount of storage space required to keep track of the history of writes.

Now consider the parity log corresponding to a data block, $A_i$, after a series of write operations. The log contains (P'T(k), P'T(k−1), . . . , P'T(2), P'T(1)) with time stamps T(k), T(k−1), . . . , T(2), and T(1) associated with the parities. Suppose that an outage occurred at time $t_1$, and it is desired to recover data to the image as it was at time $t_0$ ($t_0 \leq t_1$). To do such a recovery, for each data block $A_i$, the largest T(r) in the corresponding parity log is identified such that T(r)$\leq t_0$. The following computation is then performed:

$$A_i(r) = P'T(r) \oplus P'T(r-1) \oplus \ldots \oplus P'T(1) \oplus A_i(0) \qquad (2)$$

where $A_i(r)$ denotes the data image of $A_i$ at time T(r) and $A_i(0)$ denotes the data image of $A_i$ at time T(0). Note that:

$$P'T(l) \oplus A_i(l-1) = A_1(l-1) \oplus A_i(l-1) = A_i(l),$$

for all l=1, 2, . . . r. Therefore, this equation gives $A_i(r)$ correctly assuming that the original data image, $A_i(0)$, exists.

The above process represents a typical recovery process upon an outage that results in data loss or data damage while earlier data is available in a full backup or a mirror storage. An undo process is also possible with the parity log if the newest data is available by doing the following computation instead of the above equation:

$$A_i(r) = A_i(k) \oplus P'T(k) \oplus P'T(k-1) \oplus \ldots \oplus P'T(r+1) \qquad (3)$$

where $A_i(k)$ represents the latest data of block $A_i$.

A software prototype of a system of the invention was designed and implemented. The software prototype is a block level device driver below a file system or database systems. As a result, the implementation is file system and application independent. Any file system or database applications may readily run on top of a system of the invention. The prototype driver takes write requests from a file system or database system at block level. Upon receiving a write request, the system performs normal write into the local primary storage and at the same time performs parity computation as described above to obtain P'. The results of the parity computation are then appended to the parity log corresponding to the same LBA to be stored in the TRAP storage.

Figure 2:
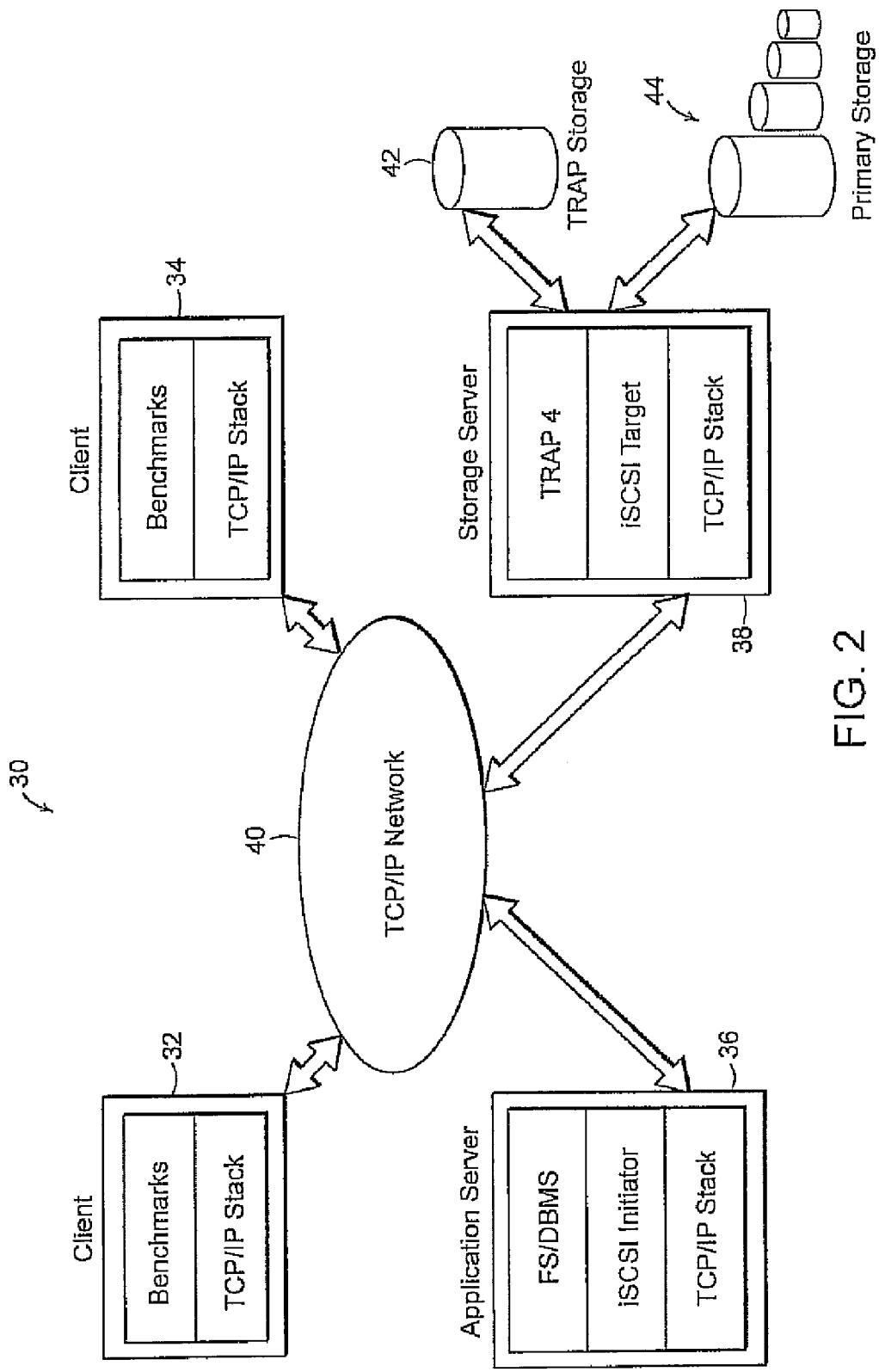
FIG. 2 shows an illustrative diagrammatic view of a system in accordance with the invention implemented in a network system that includes a plurality of servers.

The implementation is done using the standard iSCSI protocol, as shown in FIG. 2. In particular, FIG. 2 shows a network based system 30 that includes a plurality of client stations 32, 34 as well as an application server 36 and a storage server 38 that are all connected to a network 40. The storage server is also connected to a TRAP storage unit 42 and to a primary storage 44. In the iSCSI protocol, there are two communication parties, referred to as iSCSI initiator and iSCSI target. An iSCSI initiator runs under the file system or database applications as a device driver. As I/O operations come from applications, the initiator generates I/O requests using SCSI commands wrapped inside TCP/IP packets that are sent to the iSCSI target. The TRAP module is implemented inside the iSCSI target as an independent module. The main functions inside the TRAP module include parity computation, parity encoding, and logging. The parity computation part calculates P'T(k) as discussed above.

The implementation works on a configurable and fixed block size, referred to as parity block size. Parity block size is the basic unit based on which parity computation is done. All disk writes are aligned to the fixed parity block size. As a result, a disk write request may be contained in one parity block or may go across several blocks depending on the size and starting LBA of the write. The parity encoding part uses the open-source library to encode the parity before appending it to the corresponding parity log. The logging part organizes the parity log, allocates disk space, and stores the parity log in the TRAP disk. The TRAP module runs as a separate thread parallel to the normal iSCSI target thread. It communicates with the iSCSI target thread using a shared queue data structure.

As shown in FIG. 2, the implementation is on top of the standard TCP/IP protocol. As a result, the system may be set up at a remote site from the primary storage through an Internet connection. Together with a mirror storage at the remote site, the system may protect important data from site failures or disaster events.

A recovery program for the system was also implemented. For a given recovery time point (RPO), tr, the recovery program retrieves the parity log to find the timestamp, T(r), such that T(r)≦tr, for every data block that have been changed. The parity blocks were then decoded, and the XOR functionalities were then computed using either Equation (2) or Equation (3) to obtain the data block as it was at time tr for each block. Next, the computed data were stored in a temporary storage. Consistency check was then performed using the combination of the temporary storage and the mirror storage. The consistency check may do several times until the storage is consistent. After consistency was checked, the data blocks in the temporary storage were stored in-place in the primary storage and the recovery process is complete.

Figure 3:
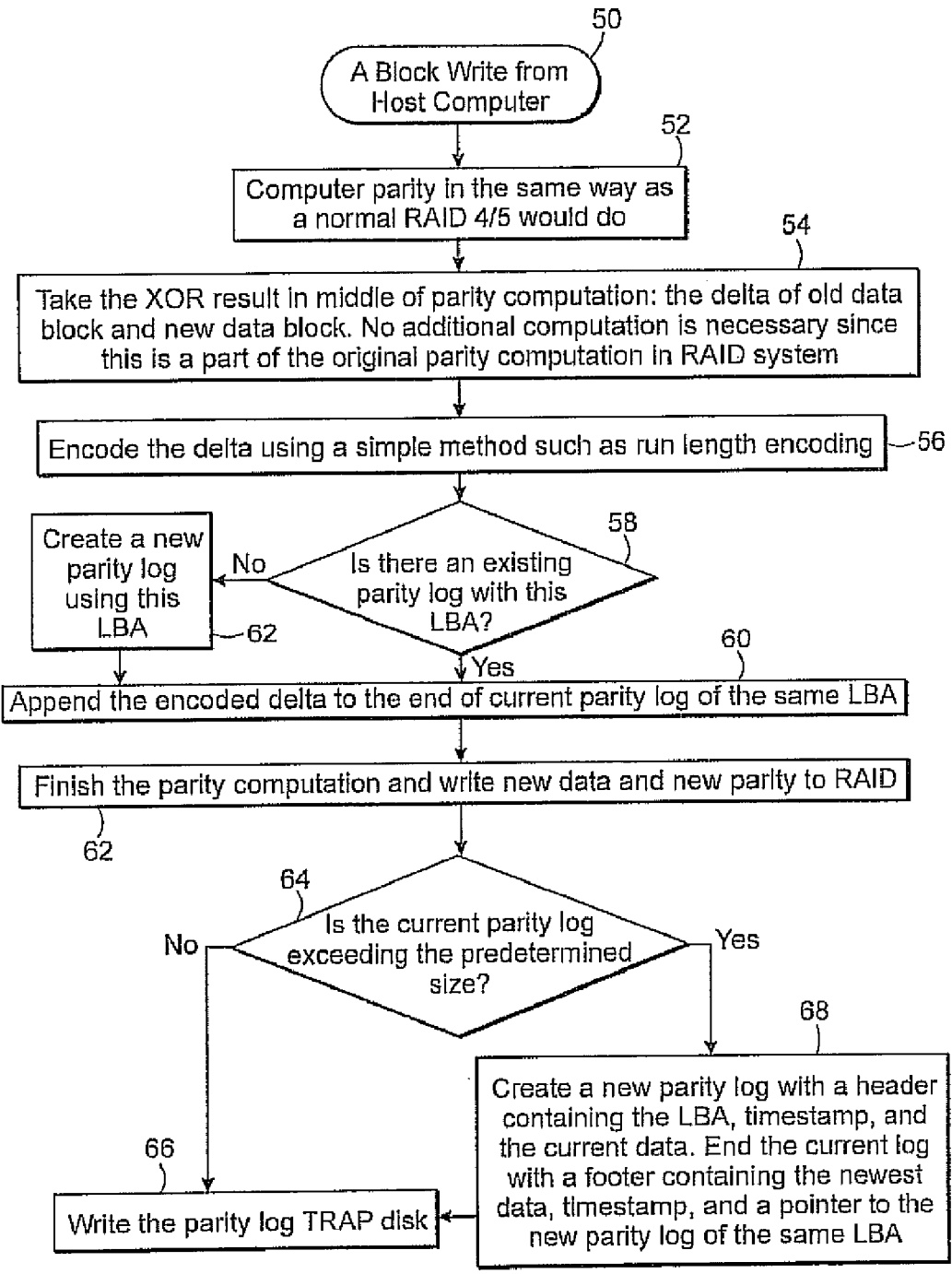
FIG. 3 shows an illustrative flowchart of a write operation in a system in accordance with an embodiment of the invention.

FIG. 3 shows a flowchart illustrating a write operation in a system in accordance with an embodiment of the invention. The write operation begins with a block write instruction from a host computer (step 50). A computer parity is then performed as would be done in a conventional RAID-4 or RAID-5 system (step 52). An Exclusive OR operation is then performed in the middle of the parity computation (step 54). The delta of the old data block and the new data block is determined. No additional computation is performed at this time since this computation is present in the RAID-4 and RAID-5 systems. The delta is then encoded (step 56) using a method such as run length encoding. The system then determines whether there is an existing parity log with this logical block address (step 58).

If there is an existing parity log with the logical block address (LBA), then the system will append the encoded delta to the end of the current parity log of the same LBA (step 60). If there is not an existing parity log the LBA, then the system will first create a new parity log using the LBA (step 62) and then append the encoded delta to the end of that parity log, which becomes the current parity log (step 60). The parity computation is then finished, and the new data and new parity are then written to the RAID disks (step 62). The system then determines whether the current parity log exceeds a predetermined size (step 64), and if not, the parity log is written to the TRAP disk (step 66). If the current parity log does exceed the predetermined size, then a new parity log is created with a header containing the LBA, timestamp, and current data (step 68).

Figure 4:
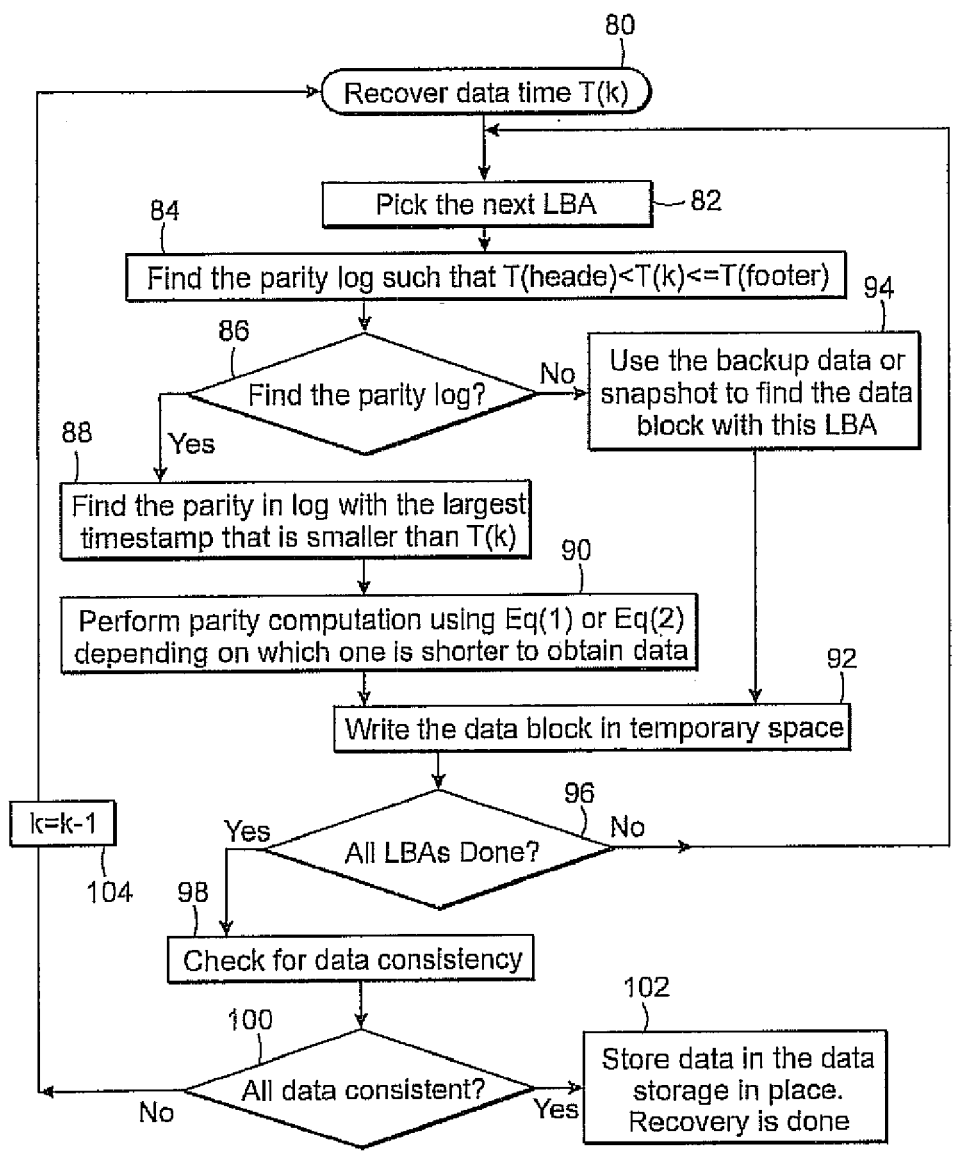
FIG. 4 shows an illustrative flowchart of a data retrieval process in a system in accordance with an embodiment of the invention.

As shown in FIG. 4, a data recovery process for recovering data to a time T(k) in a system accordance with an embodiment of the invention may begin (step 80) by picking the next LBA (step 82) and then finding the parity log such that T(header)<T(k)<=T(footer) (step 84). The system then determines whether the parity log was found (step 86). If so, the parity in the log with the largest timestamp that is smaller than T(k) is found (step 88) and the parity computation is performed (step 90). The parity computation may be performed using either of equations (2) or (3) above, whichever one will obtain the data most quickly. The data block is then written to a temporary space (step 92). If the system (step 86) did not find the parity log, then the system uses the backup data or a snapshot to find the data block with that LBA (step 94) prior to writing the data block into the temporary space (step 92).

The system then determines whether the logical block addresses have all been processed (step 96). If not, the system returns to step 82 and picks the next logical block address. If so, the system then checks for data consistency (step 98), and if all of the data is consistent (step 100), the system then stores the data in the existing data storage (step 102) and recovery is then finished. If the data is not all consistent (step 100), then the system increases the value k (step 102) and begins the process again at step 80.

The recovered data is in a crash consistency state. Techniques may also be possible to assist applications to quickly recover to the most recent consistent point at the application level. A bit error in the parity log could potentially break the entire log chain, which would not be the case for other systems that keeps all data blocks. There are two possible solutions to this: adding an error correcting code to each parity block or mirror the entire parity log. Fortunately, the system uses orders of magnitude less storage. Doubling parity log is still more efficient than conventional systems.

The parameters of storage space efficiency, RTO, and RPO are evaluated below in connection with performance impacts on various applications. A system of the invention was installed on a PC serving as a storage server as shown in FIG. 2. Four PCs were used that were interconnected using the Intel's NetStructure 10/100/1000 Mbps 470T switch. Two of the PCs act as clients running benchmarks. One PC acts as an application server. The hardware characteristics of the four PCs are shown below in Table 1.

TABLE 1

| | |
|---|---|
| PC 1, 2, &3 | P4 2.8 GHz/256M RAM/80 G + 10 G Hard Disks |
| PC 4 | P4 2.4 GHz/2 GB RAM/200 G + 10 G Hard Disks |
| OS | Windows XP Professional SP2 |
| | Fedora 2 (Linux Kernel 2.4.20) |
| Databases | Oracle 10 g for Microsoft Windows (32-bit) |
| | Postgres 7.1.3 for Linux |
| | MySQL 5.0 for Microsoft Windows |
| iSCSI | UNH iSCSI Initiator/Target 1.6 |
| | Microsoft iSCSI Initiator 2.0 |
| Benchmarks | TPC-C for Oracle (Hammerora) |
| | TPC-C for Postgres(TPCC-UVA) |
| | TPC-W Java Implementation |
| | File system micro-benchmarks |
| Network | Intel NetStructure 470T Switch |
| | Intel PRO/1000 XT Server Adapter (NIC) |

On top of the system module and the operating systems, three different types of databases were set up and two types of file systems were employed. The first benchmark, Transition Processing Performance Counsel for C standard specifications (TPC-C), is a well-known benchmark used to model the operational end of businesses where real-time transactions are processed. TPC-C simulates the execution of a set of distributed and online transactions (OLTP) for a period of between two and eight hours. It is set in the context of a wholesale supplier operating on a number of warehouses and their associated sales districts. TPC-C incorporates five types of transactions with different complexity for online and deferred execution on a database system. These transactions perform the basic operations on databases such as inserts, deletes, updates and so on. At the block storage level, these transactions will generate reads and writes that will change data blocks on disks.

A second benchmark, TPC-W, is a transactional web benchmark developed by Transaction Processing Performance Council that models an on-line bookstore. The benchmark comprises a set of operations on a web server and a backend database system. It simulates a typical on-line/E-commerce application environment. Typical operations include web browsing, shopping, and order processing.

Besides benchmarks operating on databases, file system micro-benchmarks were also formulated as listed in Table 2. The first micro-benchmark, tar, chooses five directories randomly on ext2 file system and creates an archive file using tar command. The tar command was run five times. Each time before the tar command was run, files in the directories were randomly selected and randomly changed. Similarly, zip, latex, and basic file operations cp/rm/mv were also run on five directories randomly chosen for 5 times with random file changes and operations on the directories. The actions in these commands and the file changes generate block level write requests.

TABLE 2

| Benchmark | Brief description |
|---|---|
| tar | Run 5 times randomly on ext2 |
| gcc | Compile Postgres 7.1.2 source code on ext2 |
| zip | Compress an image directory on ext2 |
| Latex | Make DVI and PDF files with latex source files on ext2 |
| cp/rm/mv | Execute basic file operations (cp, rm and mv) on ext2 |
| Linux Install | Install Redhat 8.0 on VMWare 5.0 virtual machine |
| XP Install | Install Windows XP system on VMWare 5.0 virtual machine |
| App Install | MS Office2000 and VC++ on Windows |
| VC++ 6.0 | Compile our TRAP implementation codes |

The first experiment is to measure the amount of storage space required to store TRAP data while running benchmarks on three types of databases: Oracle, Postgres, and MySQL. Three types of architectures are considered: backup and snapshot (storing changed data blocks at the end of each run), continuous data protection (storing all versions of a data block as disk writes occur both with and with out data compression) and system of the invention (which keep parity logs, e.g., as described above). Experiments were carried out for 6 different parity block sizes: 512B, 4 KB, 8 KB, 16 KB, 32 KB, and 64 KB. Actual data sizes of disk write requests are independent of the parity block size but are aligned with parity blocks. If a write request changes a data block that is contained in a parity block, then only one parity computation is done. If a write request changes a data block that covers more than one parity block, more parity computations have to be done. Whether or not a write data is within one parity block depends on the starting LBA and the size of the write.

Figure 5:
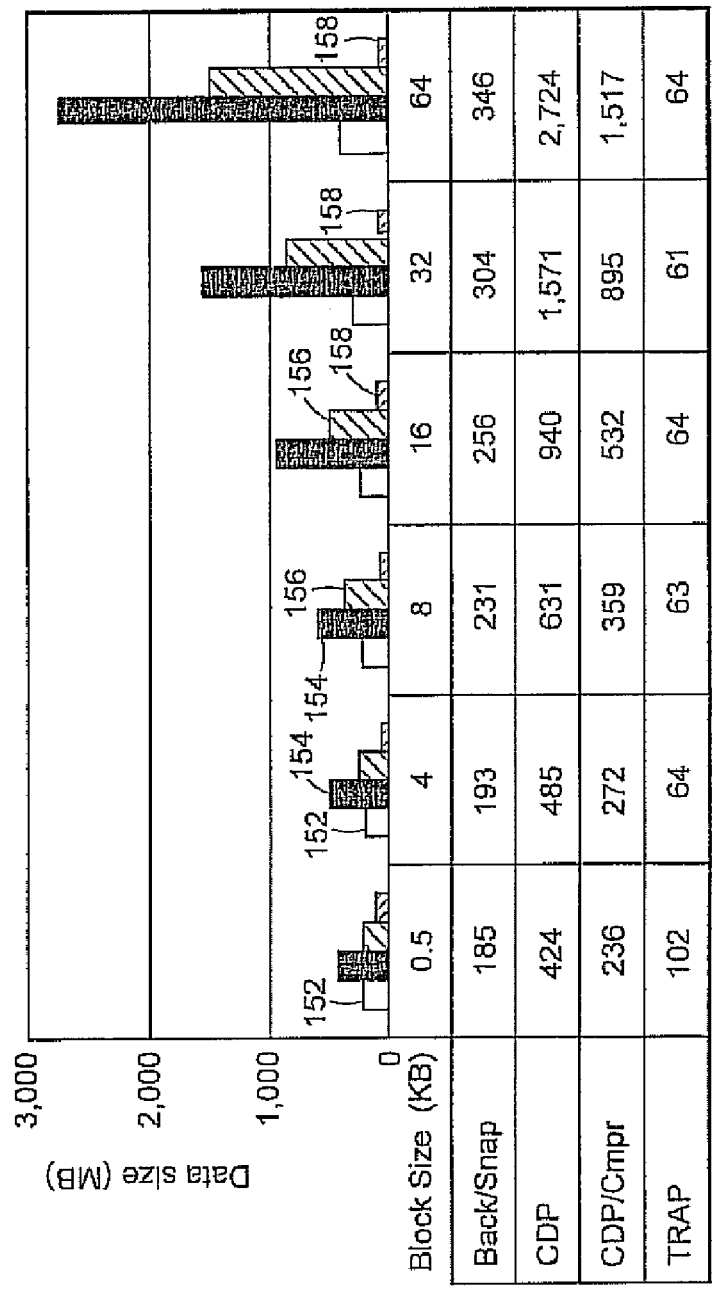
FIG. 5 shows an illustrative graphical representation of required data sizes for systems of the prior art and for a system of the invention for TPC-C for various block sizes.
Figure 6:
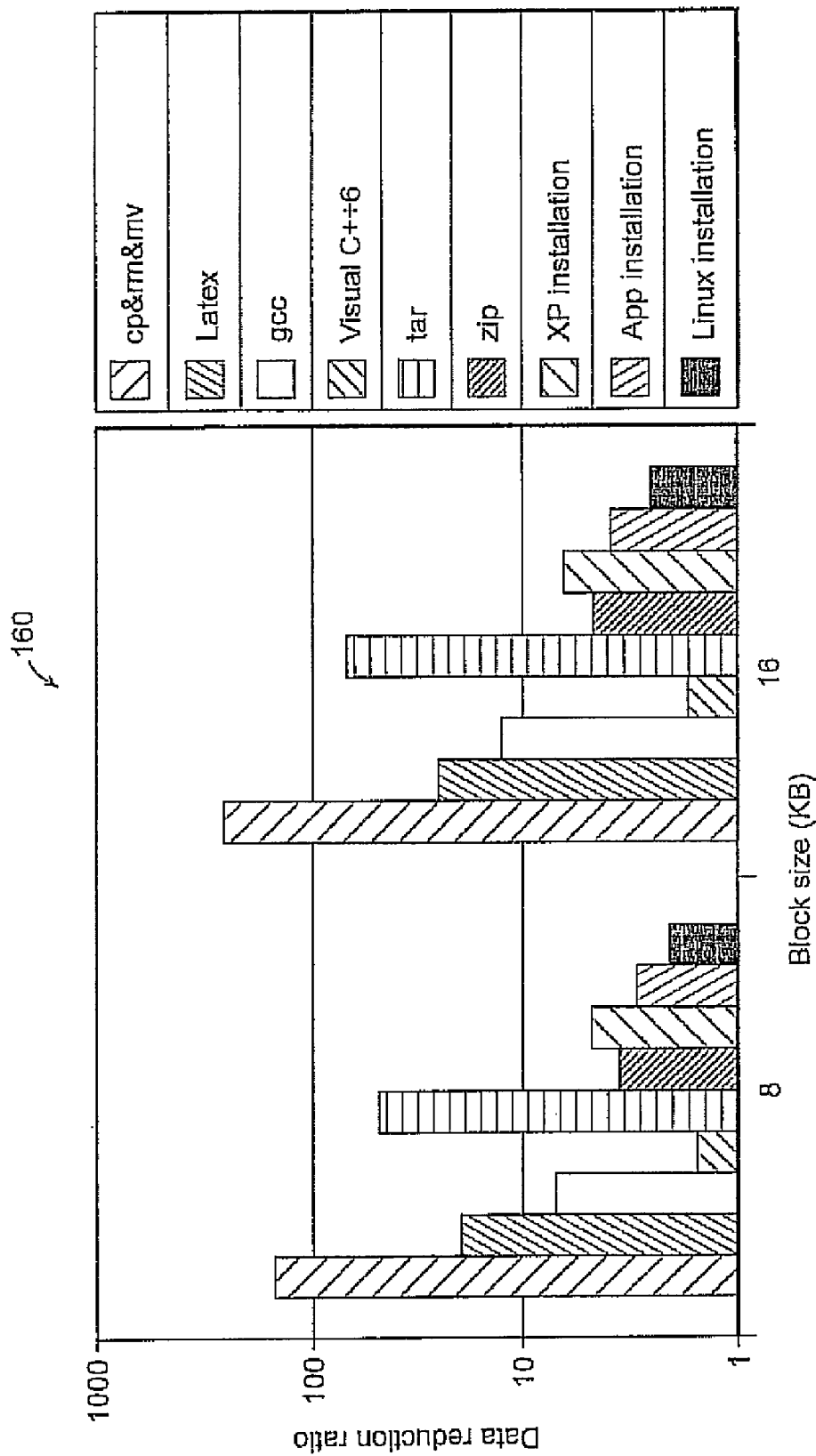
FIG. 6 shows an illustrative graphical representation of data reduction ratios for systems of the invention over a prior art system.

FIG. 5 shows at 150 the measured results in terms of Mbytes of data stored in the storage for a comparison for TPC-C. There are six sets of bars corresponding to the six different block sizes. Each set contains four bars corresponding to the amount of data stored using back-up and snap shot 152, continuous data protection without compression 154, continuous data protection with compression 156 and a system of the invention 158. It is shown that systems of the invention present dramatic reductions in required storage space compared to other architectures. For the block size of 8 KB the system of the invention reduces the amount of data to be stored in the TRAP storage by an order of magnitude compared to the CDP/Cmpr system. For the block size of 64 KB, the reduction is close to 2 orders of magnitude. It is interesting to observe that the system of the invention uses even smaller storage space than that used by a periodic backup system.

In this experiment, 25 users continuously generate transactions to 5 warehouses following the TPC-C specification with no thinking period. The amount of I/O requests generated with this workload in an hour is probably similar to one day's I/Os of medium size organizations. In this case, the amount of data in a back-up/snap shot system would be the amount of data for a daily backup. If this is the case, the system of the invention uses smaller storage space than daily backup while being able to recover data to any point-in-time. That is, with less storage space than a daily backup the system achieves near zero RPO as opposed to 24 hours RPO.

Figure 10:
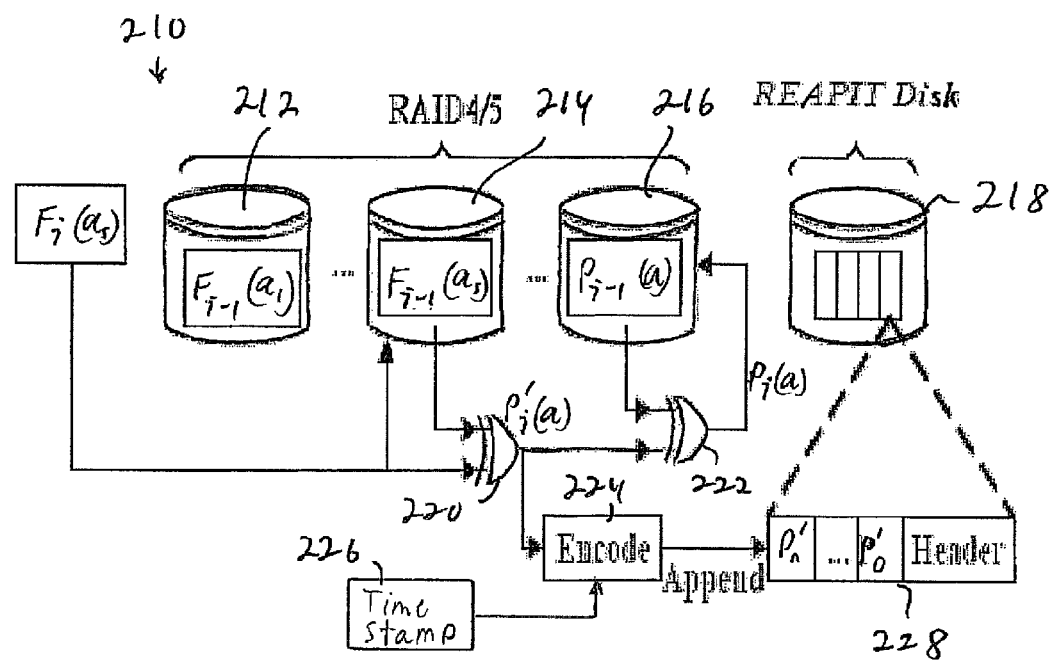
FIG. 10 shows an illustrative diagrammatic operational view of a block diagram of a distributed information system in accordance with a further embodiment of the invention.

Other systems were also tested, and micro-benchmarks were also employed for evaluation. In particular, nine micro benchmarks are run for two different block sizes, 8 KB and 16 KB. Space savings of systems of the invention over conventional systems were found to vary from one application to another, but the largest gain was observed for cp/rm/mv commands and the smallest gain was observed for Visual C++6 The largest gain goes up to 2 orders of magnitude while the smallest gain is about 60%. The data reduction ratios of all micro benchmarks are shown in FIG. 10 in logarithmic scale. As shown at 160, the ratio varies between 1.6 and 256 times. The average gain for 8 KB block size is 28 times, and the average gain for 16 KB block size is 44 times.

Figure 7:
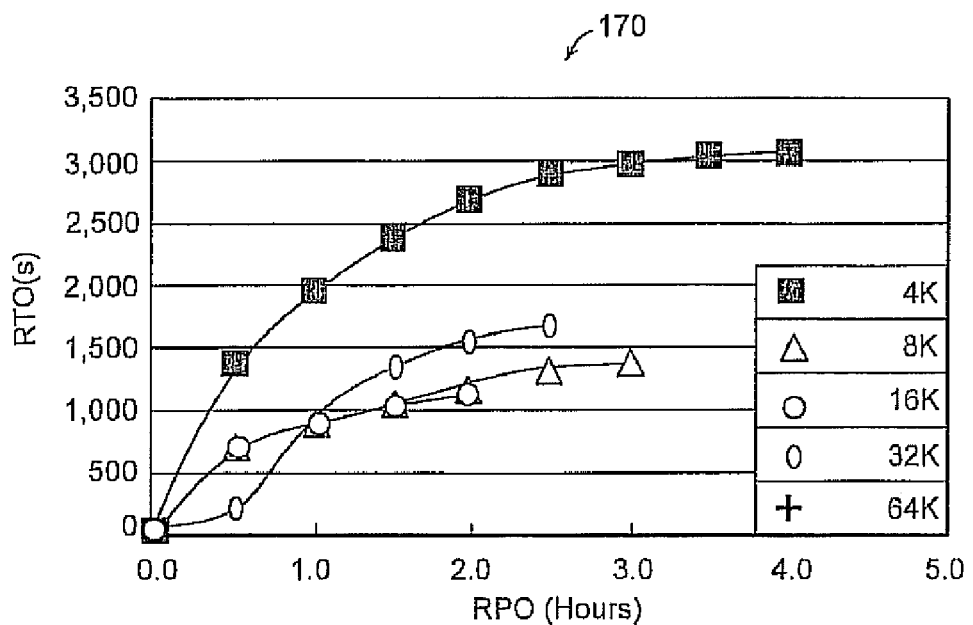
FIG. 7 shows an illustrative graphic representation of the relationship between RPO and RTO for systems of the invention.

FIG. 7 shows at 170 the RTO as functions of RPO for five different block sizes. Note that our recovery process is actually an undo process using Equation (3) as opposed to Equation (2) that represents a redo process. An undo process starts with the newest data and traces back the parity logs while redo process starts with a previous data and traces forward the parity logs. With the undo process, the RTO increases as RPO increases because the farther back the parity logs are traced, the longer time it takes to recover data. The results would be just the opposite if data is recovered using Equation (2). Depending on the types of outages and failure conditions, one can choose to use either process to recover data. For example, if the primary storage is damaged without newest data available, data must be recovered using a previous backup together with parity logs using Equation (2). On the other hand, if a user accidentally performed a wrong transaction, an undo process could be used to recover data using Equation (3).

Figure 8:
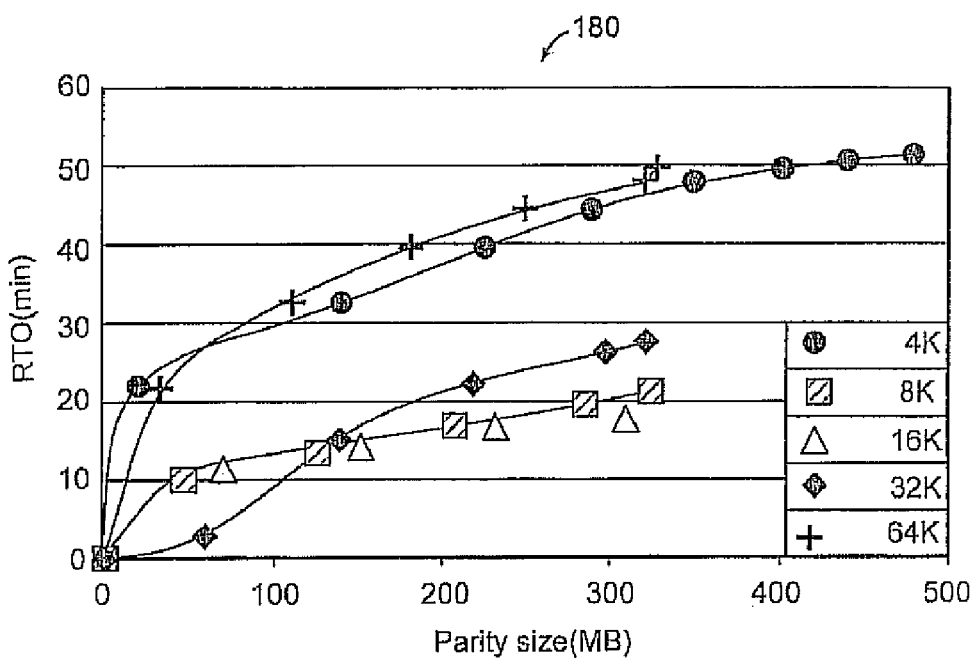
FIG. 8 shows an illustrative graphical representation of RTO versus parity size for a system of the invention.

Whether one performs an undo recovery using Equation (3) or a redo recovery using Equation (2), the RTO depends on the amount of parity data traversed during the recovery process. To illustrate this further, RTO was plotted as functions of parity log sizes traversed while doing recovery as shown at 180 in FIG. 8. The recovery time varies between a few seconds to about 1 hour for the data sizes considered. It should be noted that the amount of storage for TRAP-3 architecture is over 10 GB corresponding to the parity size of 300 MB. This may be used as a guide to users for choosing a shorter RTO recovery process depending on the RPO, the parity log size, and the availability of newest data or a previous backup.

During the recovery experiments it was observed that block sizes of 8 KB and 16 KB give the shortest recovery time. This result can be mainly attributed to the fact that most disk writes in the experiments fall into these block sizes. As a result, write sizes match well with parity block sizes. If the block size for parity computation were too large or too small, more parity computations and disk I/Os would have to be performed than necessary, resulting in longer recovery time and higher overhead as will be discussed shortly.

Table 3 shows below the measured computation time for XOR and the decoding process in a system of the invention implemented on PC1 as discussed above.

TABLE 3

| Block Size(KB) | XOR(ms) | Decode(ms) |
|---|---|---|
| 4 | 0.026414 | 0.073972 |
| 8 | 0.053807 | 0.132586 |
| 16 | 0.105502 | 0.213022 |

TABLE 3-continued

| Block Size(KB) | XOR(ms) | Decode(ms) |
|---|---|---|
| 32 | 0.214943 | 0.335425 |
| 64 | 0.421863 | 0.603595 |

In order to compare the recovery time, RTO, the time it takes to do the XOR and decoding operations of the invention and that of the prior art were measured as shown in Table 3.

A new disk array architecture is therefore presented that is capable of providing timely recovery to any point-in-time for user data stored in the array, referred to as TRAP array. A prototype of the new TRAP architecture has been implemented as a block level device driver. File systems such as ext2 and NTFS, and databases such as Oracle, Postgres, and MySQL, have been installed on the prototype implementation. Standard benchmarks including TPC-C, TPC-W, and file system benchmarks are used to test the performance of the new storage architecture. Extensive experiments have demonstrated up to 2 orders of magnitude improvements in terms of storage efficiency. Recovery experiments have also been carried out several dozen times to show the quick recovery time of the new architecture. Measurements have also shown that the new architecture has little negative performance impact on application performance while providing continuous data protection capability.

Distributed Electronic Information Systems

In accordance with further embodiments, the invention also provides a new distributed data storage architecture that facilitates secure and efficient data replay in information systems such as distributed electronic healthcare information systems. The new architecture uses secured iSCSI protocol and records the parity of every data change to the information system performed by authorized persons. The recording and transmission of encrypted parities are done in background without requirement of explicit involvement of users. Together with either backup data or real-time production data, one can easily replay a data record as it was at any point-in-time in the past using simple reverse parity computations. Because parities are substantially smaller than original data, the new system provides much higher online performance and fast encryption time. Experimental results on our prototype system have shown the clear advantages of systems of the invention.

A new secured data storage architecture is disclosed, as an example, supporting replay/review of electronic health record (EHR) data as it was at any point-in-time in the past by any authorized healthcare provider in a distributed electronic healthcare information system. The new system is referred to herein as REAPIT for Replay EHR at Any-Point-In-Time. The main idea of REAPIT is to calculate and store parity as result of any data change at block storage level. As a data block is being changed, a log of parities are computed and stored. When a replay is requested for a specific point-in-time in the past, the corresponding parities are retrieved. Using either current real-time production data or a previous backup data, a simple reverse parity computation will generate the exact data as it was at the specified point-in-time.

The clear advantages of REAPIT are three-fold. First, the parity as a result of data change is substantially smaller than the data itself being changed. Capturing these parities can be done very efficiently. Transmission of these parities over the distributed network can also be done very quickly. Secondly, transmitting and storing parity add another level of security because wire-tappers cannot easily interpret the meaning of parity without original data. Furthermore, encrypting parity is much faster than encrypting original data because of much smaller size of parities than that of original data. Finally, the new REAPIT system is user friendly because parity capture and transfer are done in background at storage level without requiring users' explicit involvement. The user-friendly interface allows a user to choose any point-in-time to replay EHR data.

To show the advantages of the newly proposed REAPIT system, experiments were carried out on a prototype REAPIT system using Secured iSCSI protocol. Under the Microsoft Windows environment, the performance of REAPIT was measured as compared to traditional storage systems providing the same functionality. Standard database and file system benchmarks are used to drive the experimental system. Numerical results show that REAPIT is very efficient, providing significant performance improvements as compared to traditional storage systems.

Figure 9:
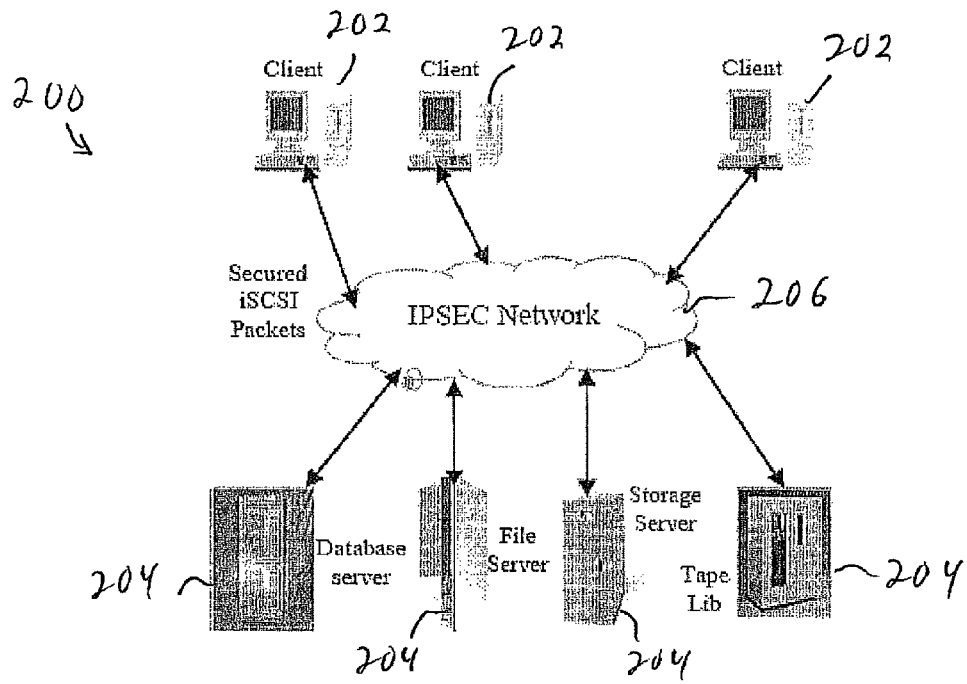
FIG. 9 shows an illustrative diagrammatic view of a distributed information system in which a method of the invention may be employed.

FIG. 9 shows at 200 a distributed EHR system in which multiple clients 202 are connected to shared storage servers 204 through the IPSEC network 206. Each of the clients 202 represents an authorized healthcare provider such as doctors, radiologists, cardiologist, pathologist, dentists, dermatologist, neurologist, etc. Any client 202 can access, modify, add, or delete information in the shared storages 204. Since IPSEC runs over the Internet, clients and storage servers can be located in any geographical location allowing true patient data sharing among healthcare providers. As shown in FIG. 9, providing real time data sharing and data access is fairly straightforward among multiple health providers. The important issue, however, is how to capture the history of data accesses and data changes securely in such a distributed information system.

In accordance with an embodiment, the REAPIT system includes a pair of software modules that are inserted to each client and shared storages, respectively. The software module inserted in a client is called an iSCSI initiator and the module inserted in a shared storage system is called an iSCSI target. Both modules work at block device level beneath the file system or databases. Users do not need to know of the existence of these modules. All input/output (I/O) operations generated at the upper application layer go through the file system or database down to the block level device and become data block reads or writes. The iSCSI initiator representing client applications communicates directly with the corresponding iSCSI target through secured IP network by exchanging data blocks for real time operations. In order to support replay of history data in addition to real time data accesses, all data access and data changes need to be recorded. For example, if a 64 KB (typical data block size) data block is changed, both the newly changed block and the original block before the change should be kept in order to replay data in the future. As data changes occur, the amount of data that needs to be stored and transmitted over the network continues to increase dramatically.

The idea of the new REAPIT system is straightforward; instead of keeping all versions of a data block as it is being changed by write operations, the system keeps a log of parities as a result of each write on the block. Every time a write operation happens, the iSCSI initiator calculates the parity and transmits the parity to the iSCSI target that store parities in a log structure. The parity logs are accessible to all clients for replay purpose. During a replay, the iSCSI initiator makes a replay request to the target with a specified time point. The target then finds the corresponding parity in the parity logs to compute back the data as it was at the specified time point.

Since all parities of write operations are stored, the approach can replay EHR as it was at any point-in-time by parity computation.

FIG. 10 shows the basic design of the REAPIT architecture in a typical RAID storage system. As shown in FIG. 10, the system 210 includes a plurality of data storage disks 212, 214, 216 in a redundant array of inexpensive disks (RAID) system such as a RAID-4 or RAID-5 system as discussed above. The system also includes a REAPIT disk 218 and a plurality of bit-wise exclusive OR functionality components 220, 222 that are coupled to the RAID disks. Suppose that at time point i, the client writes into a data block with logic block address $a_s$ that belongs to a data stripe $a=(a_j, a_2 \ldots a_s, \ldots a_n)$. The RAID controller performs the following operation to update its parity disk:

$$P_i(a) = F_i(a_s) \oplus F_{i-1}(a_s) \oplus P_{i-1}(a) \quad (4)$$

where $P_i(a)$ is the new parity for the corresponding stripe, $F_i(a)$ (shown at 230) is the new data for data block $a_s$, $F_{i-1}(a_s)$ is the old data of data block $a_s$, and $P_H(a)$ is the old parity of the stripe. Leveraging this computation, REAPIT appends the first part of the above equation, i.e. $P_1'(a) = F_i(a_s) \, F_{i-1}(a_s)$, to the parity log stored in the REAPIT disk after a simple encoding box 224 that is coupled to a time stamp circuit 226, as shown in FIG. 10. The encoding may be implemented in either hardware or software, and may provide run-length encoding or any type of compression algorithm. The time stamp is provided to each block of encoded data $P_n'$, and each block of encoded data $P_n'$ has a variable length that depends on, for example, the number of non-zero bits encountered in the $F_i$. The appended blocks of data $P_n'$ include a header, and together form a parity log 228 that is stored in the REAPIT disk 218. In further embodiments, further disks $F_{i-n}$ or $F_{i+n}$ may also include encoder and time stamp circuits coupled to the parity output bit of each disk for generating parity log data that is stored in a REAPIT disk.

Parity computation can also be done easily for non RAID storage systems as discussed in "A case for Continuous Data Protection at Block Level in Disk Array Storages" by Weijun Xiao and Qing Yang, *IEEE Transactions on Parallel and Distributed Systems*, Vol. 20, Issue 6, pp. 898-911 (June 2009), the disclosure of which is hereby incorporated by reference.

Consider the parity log corresponding to a data block, a, after a series of write operations, the log contains $(P_1'(a), P_2'(a), \ldots, P_{i-1}'(a), P_i'(a), \ldots)$ with time points $1, 2, \ldots, i-1$, and i associated with the parities. Suppose that we only have the data image at time point r ($1 \leq r \leq i$) and all parities, and we would like to replay data backward or forward. To do a forward replay to time point s (s>r), for example, we perform the following computation for each data block a:

$$F_s(a) = F_r(a) \oplus P'_{r+1}(a) \oplus \ldots \oplus P'_{s-1}(a) \oplus P'_s(a) \quad (5)$$

where $F_s(a)$ denotes the data value of block a at time point s and $F_r(a)$ denotes the data value of a at time point r. Note that $$P'_l(a) \oplus F_{l-1}(a) = F_l(a) \oplus F_{l-1}(a) \oplus F_{l-1}(a) = F_l(a)$$

for all l=1, 2, . . . i. Therefore, Equation (5) gives Fs(a) correctly assuming that the data value, Fr(a), exists.

The above process represents a typical redo replay process while earlier data is available. A backward process is also possible with the parity log if the newest data is available by doing the following computation instead of Equation (5):

$$F_s(a) = F_r(a) \oplus P'_r(a) \oplus P'_{r-1}(a) \oplus \ldots \oplus P'_{s+1}(a) \quad (6)$$

where s<r. This is a typical undo process by using the newest data that is available. In order to replay data in either direction, only one reference image is needed along time dimension because of the commutative property of XOR computation. This reference image could be original data image in a backup, real-time fresh data image, or any data image in the middle.

Besides being able to replay data in two directions, an important feature of REAPIT is its space efficiency. Extensive experiments have demonstrated a very strong content locality that exists in real world applications and have shown that only 5% to 20% of bits inside a data block actually change on a write operation. The parity, $P_i'(a)$, reflects the exact changes at bit level of the new write operation on the existing block. As a result, this parity block contains mostly zeros with a very small portion of bit stream that is nonzero. Therefore, it can be easily encoded to a small size parity block to be appended to the parity log reducing the parity transmission time and the amount of storage space required to keep track of the history of writes.

In order to see how REAPIT performs in a real distributed eHealthcare information system, a cluster of four PCs connected through an Ethernet switch was set up, with two Windows based PCs acting as clients, one PC acting as an application server, and the 4th PC acting as a storage server. the iSCSI initiator module based on the Windows standard iSCSI initiator was installed on the client PCs and application server PC, while the iSCSI target module was installed on the storage server. The iSCSI initiators communicated with the iSCSI target on the storage server using IPSEC protocol. All encoded parities were stored at the iSCSI target in a log format with time stamps to allow replay of history data by any authorized client. Table 4 below shows the hardware and software settings in the evaluation experiments.

TABLE 4

| | |
|---|---|
| PC 1-3 | P4 2.8 GHz/256M RAM/80 G + 10 G Hard Disks |
| PC 4 | P4 2.4 GHz/2 GB RAM/200 G + 10 G Hard Disks |
| OS | Windows XP Professional SP2 |
| | Fedora 2 (Linux Kernel 2.6.9) |
| Databases | Oracle 10 g for Microsoft Windows (32-bit) |
| | MySQL 5.0 for Microsoft Windows |
| iSCSI | UNH iSCSI Initiator/Target 1.6 |
| | Microsoft iSCSI Initiator 2.0 |
| Benchmarks | TPC-C for Oracle (Hammerora) |
| | TPC-W Java Implementation |
| | File system micro-benchmarks |
| Network | Intel NetStructure 470T Switch |
| | Intel PRO/1000 XT Server Adapter (NIC) |

Because of privacy requirement of real patient data, it was not possible to obtain realistic patient data for the experiments. In order to make the performance evaluation close to realistic situations, a set of standard database benchmarks were chosen as well as real file system benchmarks.

The benchmarks selected for database evaluations include TPC-C and TPC-W. TPC-C is a well-known benchmark used to model the operational end of real-time transactions. TPC-C simulates the execution of a set of distributed and on-line transactions (OLTP) for a period of between two and eight hours. TPC-C incorporates five types of transactions with different complexity for online and deferred execution on a database system. These transactions perform the basic operations on databases such as inserts, deletes, updates and so on. At the block storage level, these transactions will generate reads and writes that will change data blocks on disks. For Oracle Database, one of the TPC-C implementations developed by Hammerora Project was used. Data tables were built with 25 users issuing transactional workloads to the Oracle database following the TPC-C specification. The installation of the database including all tables required a total of 3 GB of storage.

TPC-W is a transactional web benchmark developed by Transaction Processing Performance Council that models an on-line bookstore. The benchmark comprises a set of operations on a web server and a backend database system. It simulates a typical on-line/E-commerce application environment. Typical operations include web browsing, shopping, and order processing. Tomcat 4.1 is used as an application server and MySQL 5.0 as a backend database. The configured workload includes 30 emulated browsers and 10,000 items in the ITEM TABLE as shown below.

TABLE 5

| Benchmark | Brief description |
| --- | --- |
| tar | Run 5 times randomly on ext2 |
| gcc | Compile Postgres 7.1.2 source code on ext2 |
| zip | Compress an image directory on ext2 |
| Latex | Make DVI and PDF files with latex source files on ext2 |
| cp/rm/mv | Execute basic file operations (cp, nn and mv) on ext2 |
| Linux Install | Install Redhat 8.0 on VMWare 5.0 virtual machine |
| XP Install | Install Windows XP system on VMWare 5.0 virtual machine |
| App Install | MS Office2000 and VC++ on Windows |
| VC++ 6.0 | Compile our REAPIT implementation codes |

Besides benchmarks operating on databases, file system micro-benchmarks were formulated as listed in Table 5. The first micro-benchmark, tar, chooses five directories randomly on ext2 file system and creates an archive file using tar command. The tar command was run five times. Each time before the tar command was run, files in the directories were randomly selected and randomly changed. Similarly, zip, latex, and basic file operations cp/rm/mv were run on five directories randomly chosen for 5 times with random file changes and operations on the directories. The actions in these commands and the file changes generated block level write requests. Two compiler applications, gcc and VC++6.0, compiled Postgres source code and our REAPIT implementation codes, respectively. Linux Install, XP Install, and App Install were actual software installations on VMWare Workstation that allows multiple OSs to run simultaneously on a single PC. The installations included Redhat 8.0, Windows XP, Office 2000, and Visual C++ for Windows.

Based on the experimental settings discussed above, total execution time needed to encrypt and transmit history data (EHR) to storage servers was measured. The intent was to compare the performance of REAPIT with the traditional storage system that supports replay of patient data at any point-in-time. As discussed previously, REAPIT captures the parity of data change while the traditional storage keeps both old copy and new copy of the data block upon a write operation to the block.

Figure 11:
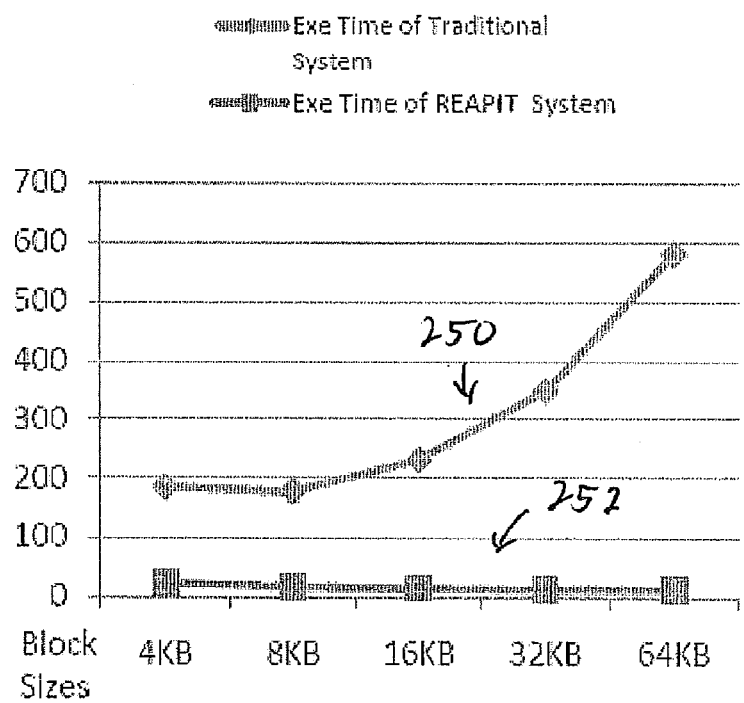
FIG. 11 shows a graphic illustration of total execution times for encryption and transmission of history data of two hours TPC-C transactions on Oracle databases in terms of second for traditional systems as well as for systems of an embodiment of the invention.

The first experiment was running TPC-C benchmark on Oracle database. Continuous database transactions were performed for 1 hour period following the TPC-C specification. As results of these transactions, many data blocks were changed at storage level. The changed data was then encrypted and transmitted to the storage servers. FIG. 11 shows the measured total execution time of data encryptions and transmissions over the IPSEC network to the shared storages. Five execution times are shown for 5 different data block sizes from 4 KB to 64 KB. The block is the basic data unit based on which data transmissions are performed at storage level (Windows default block size is 64 KB). The execution times shown in FIG. 11 are extra overheads in order to support data replay for any point-in-time of patient history data.

As shown at 250 in FIG. 3, the traditional storage system takes prohibitively long time to support data replay with overheads ranging from about 177 seconds to 581 seconds for one hour's database transactions. Our REAPIT system, on the other hand as shown at 252, takes well under 20 seconds extra time to encrypt and transmit parities for 1 hour of intensive database transactions. In other words, REAPIT can support replay of patient data as it was at any point-in-time with no noticeable performance slowdown from a user's point of view.

Figure 12:
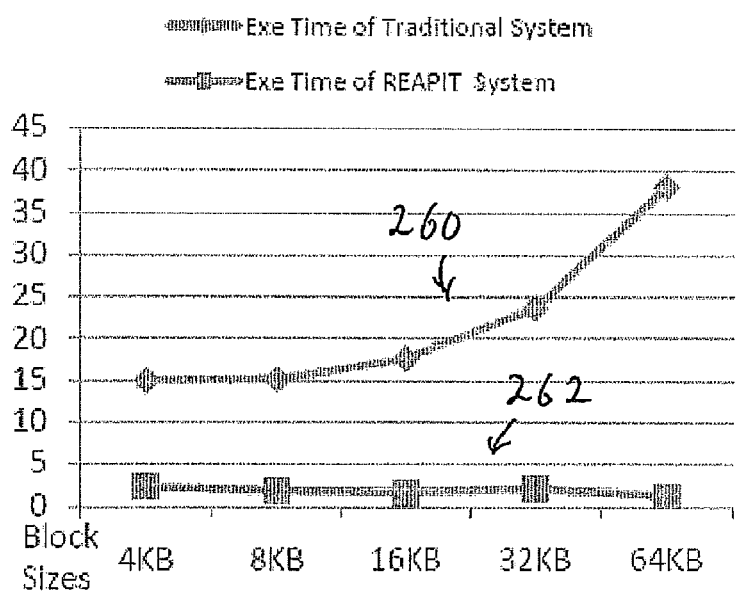
FIG. 12 shows a graphic illustration of total execution times for encryption and transmission of history data of three thousand TPC-C transactions on Microsoft SQL databases in teens of second for traditional systems as well as for systems of an embodiment of the invention.

The next experiment was to measure the total execution time of TPC-W on Microsoft SQL databases. A fixed number of transactions were performed on the SQL database using both traditional storage system and REAPIT storage system by varying block size from 4 KB to 64 KB. The measured results are shown at 260 in FIG. 12 for a traditional system and shown at 262 for a REAPIT system of an embodiment of the invention. Similar to TPC-C, an order of magnitude performance improvement of the REAPIT system over the traditional storage system is observed to support data replay of patient history data.

Figure 13:
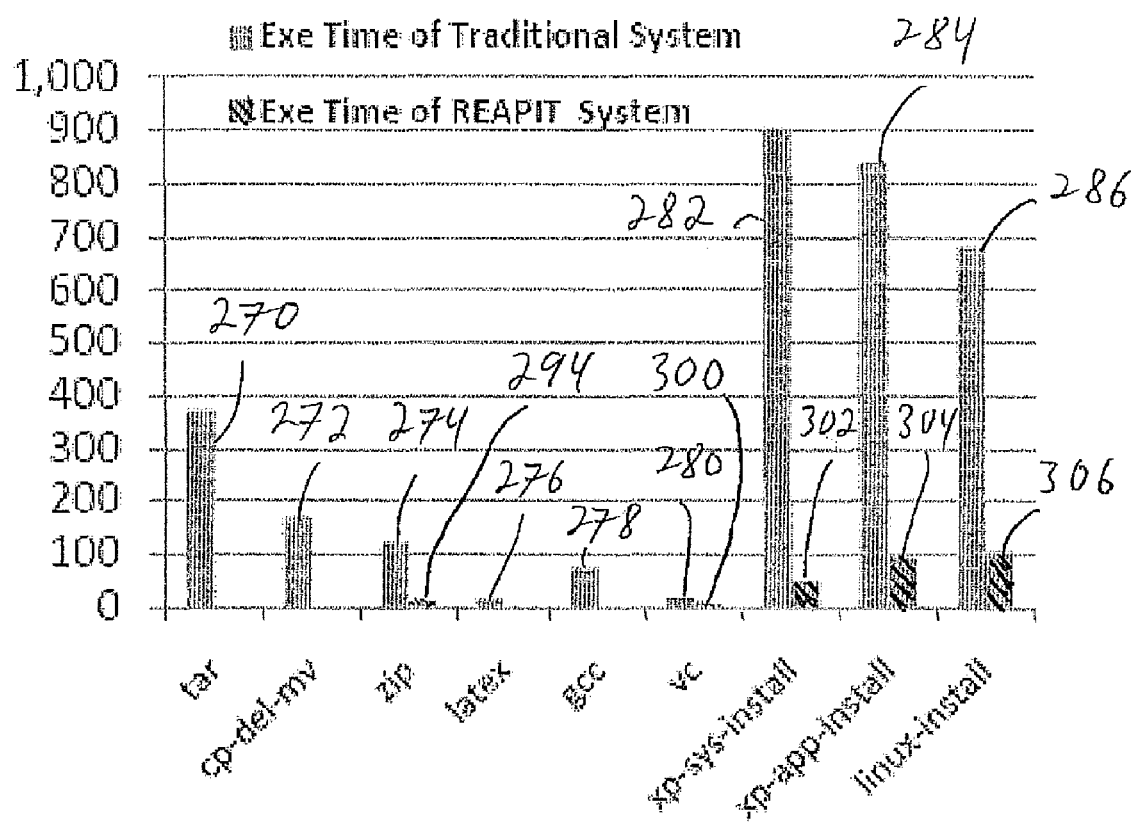
FIG. 13 shows a graphic illustration of a comparison of total execution times for encryption and transmission of history data of file system micro benchmarks in terms of seconds for traditional systems as well as for systems of an embodiment of the invention.
Figure 1:
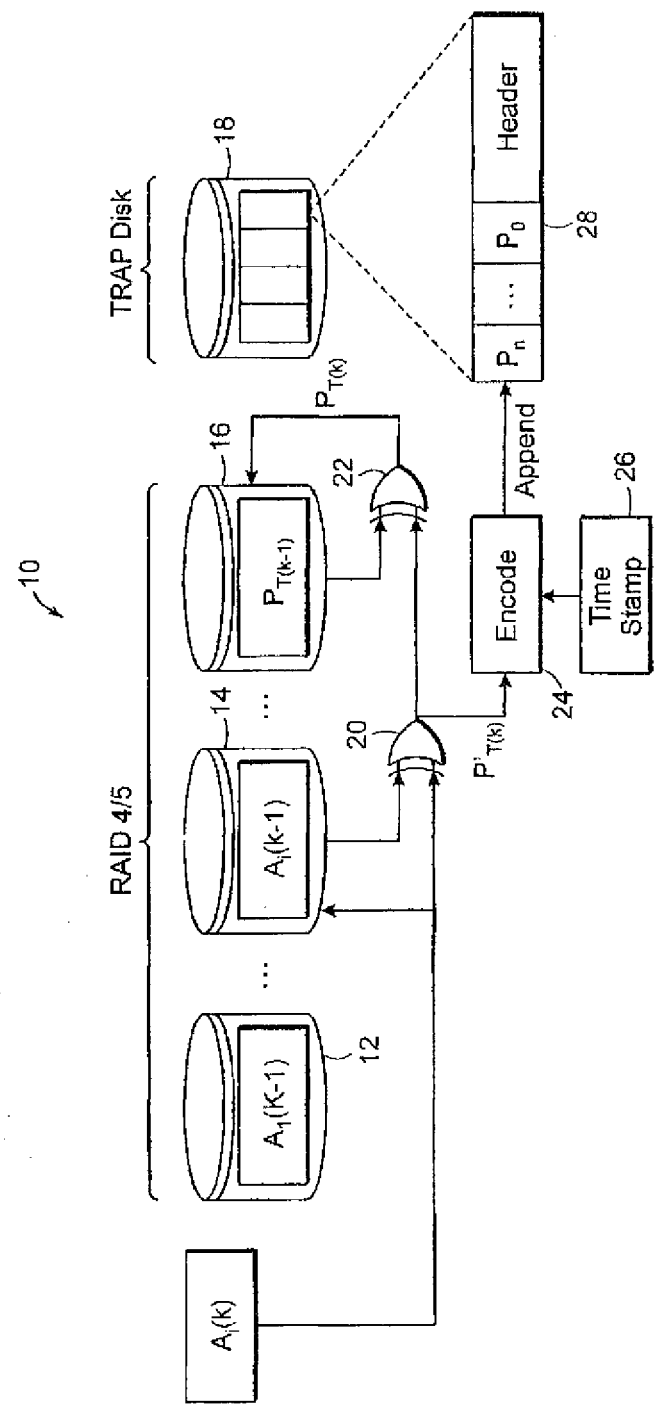
Figure 2:
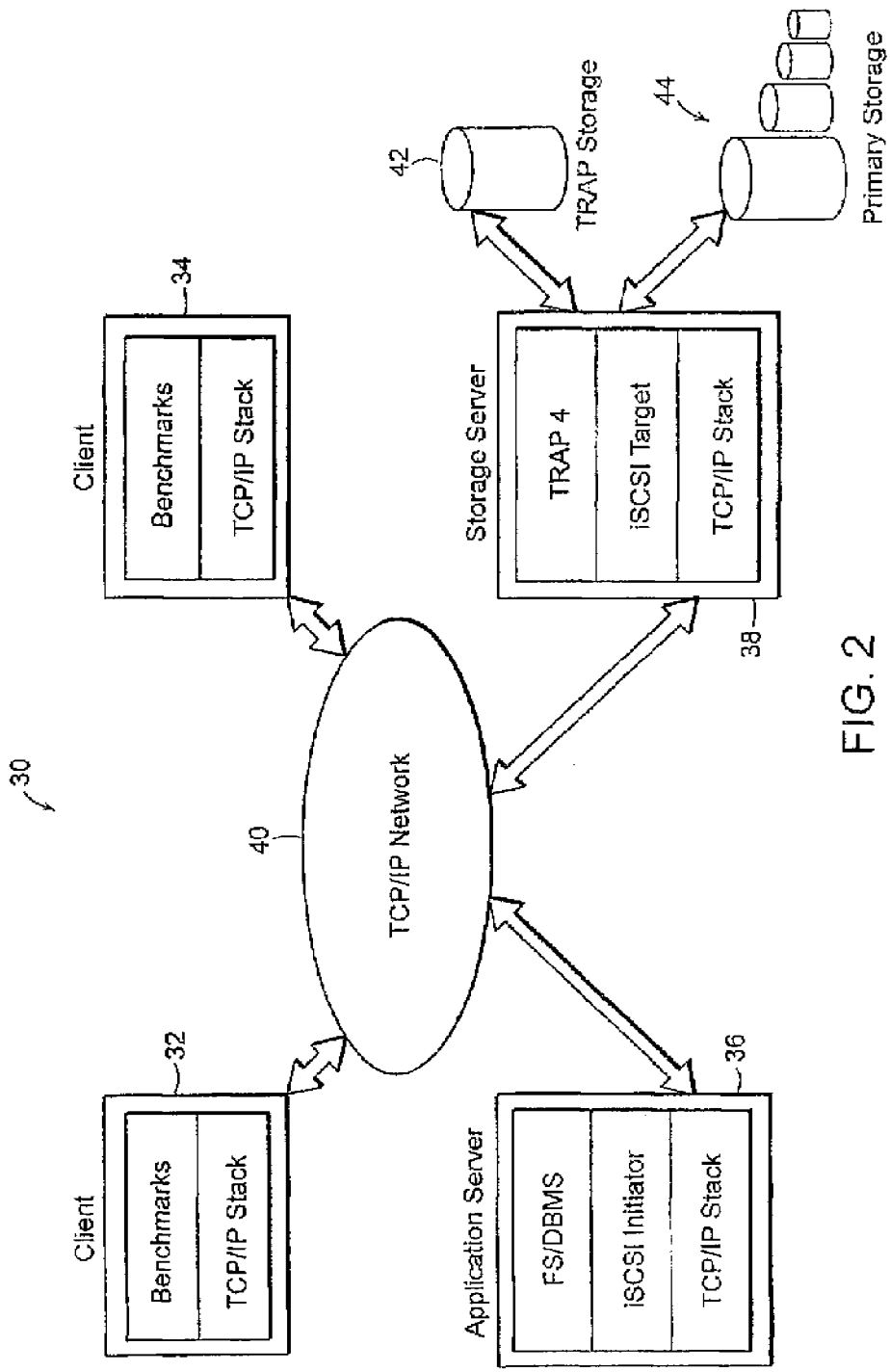
Figure 3:
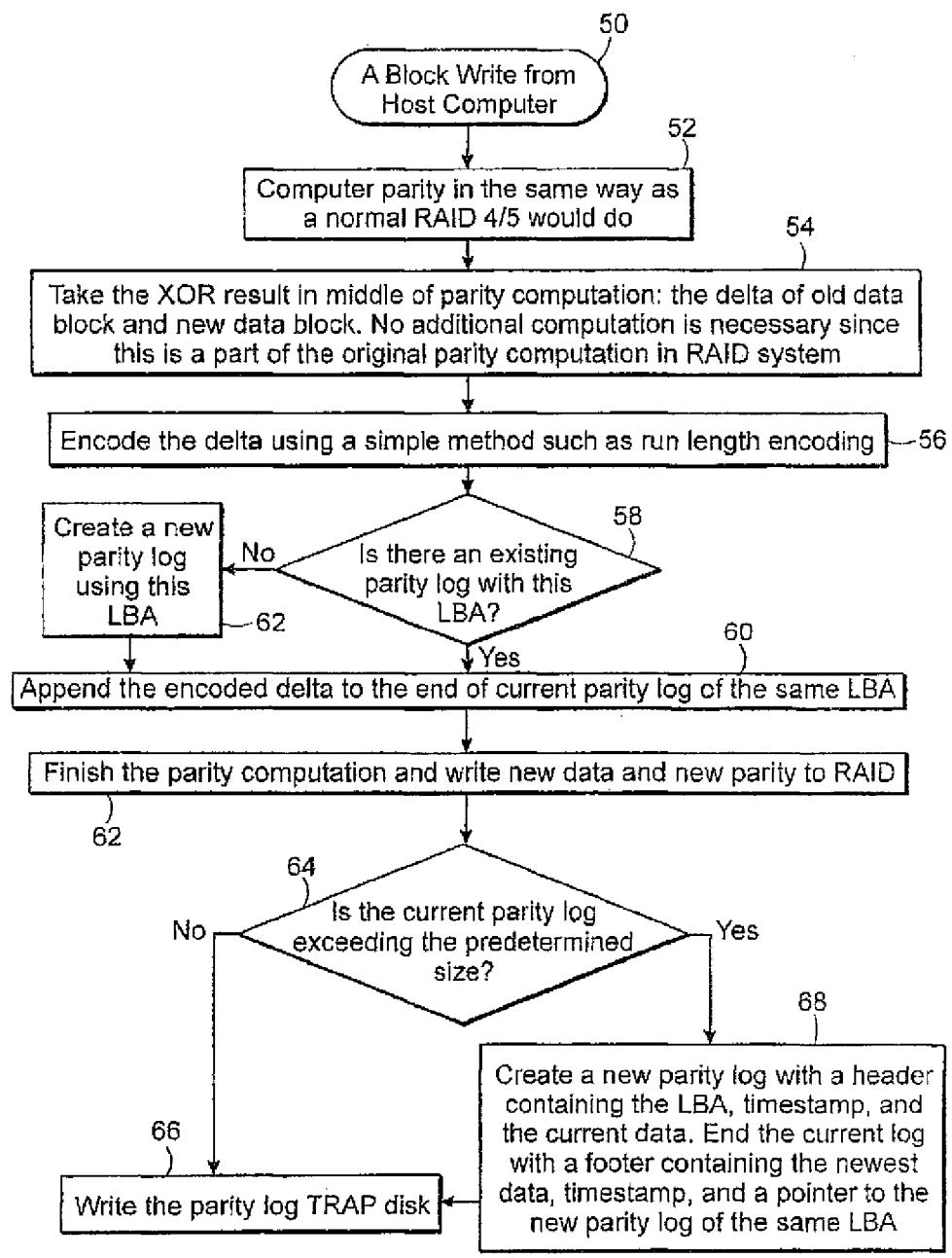
Figure 4:
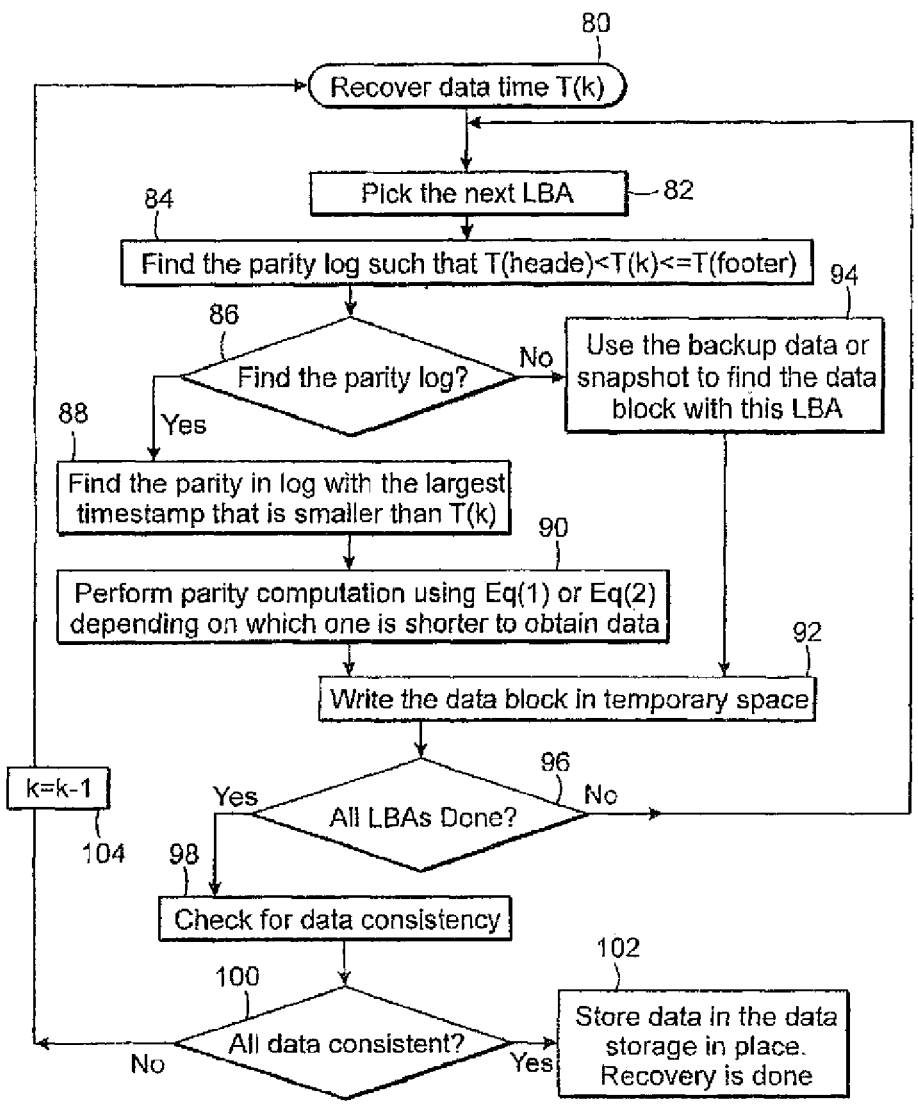
Figure 5:
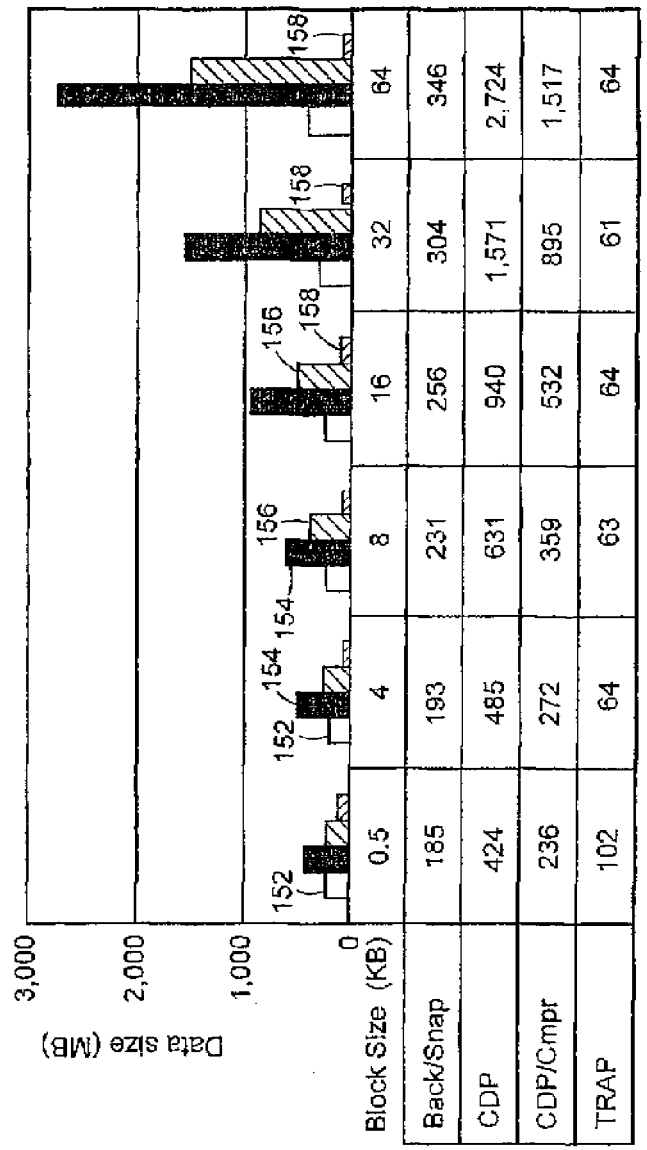
Figure 6:
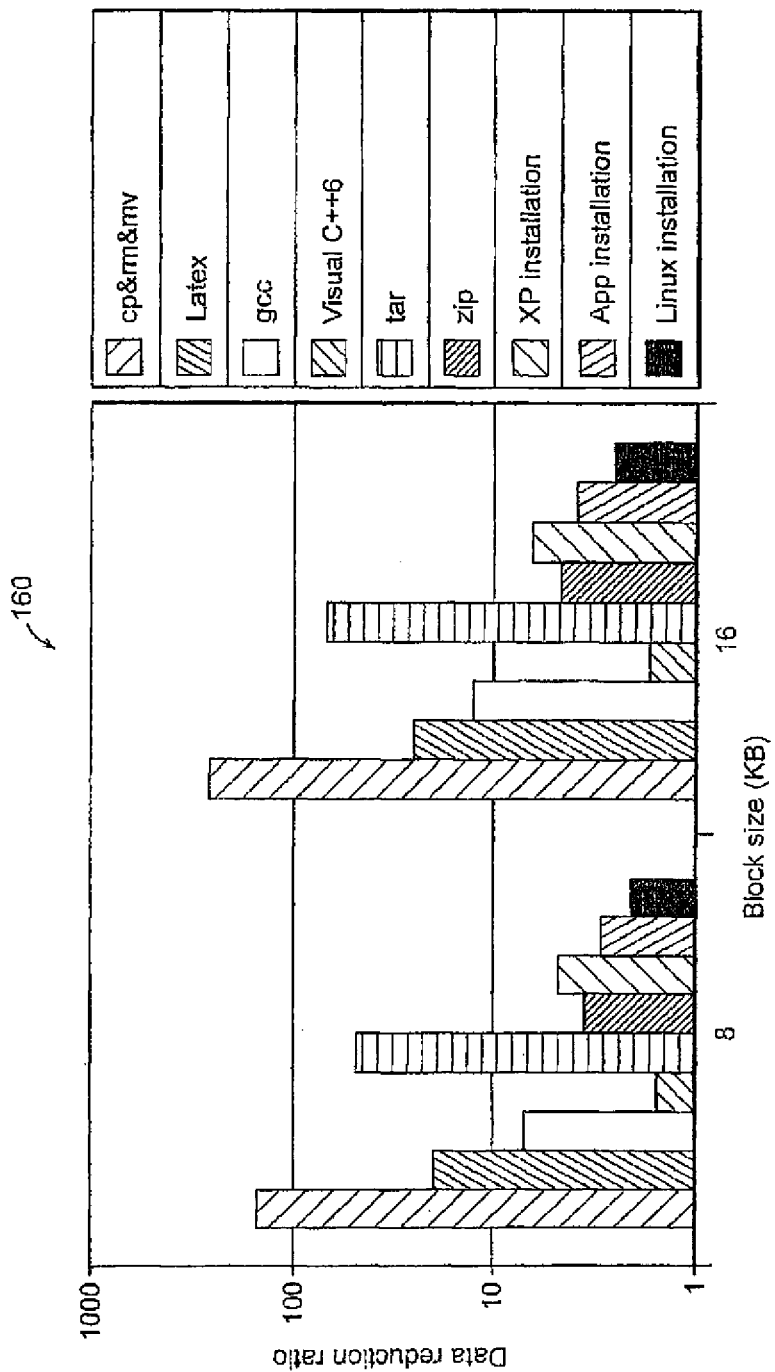
Figure 7:
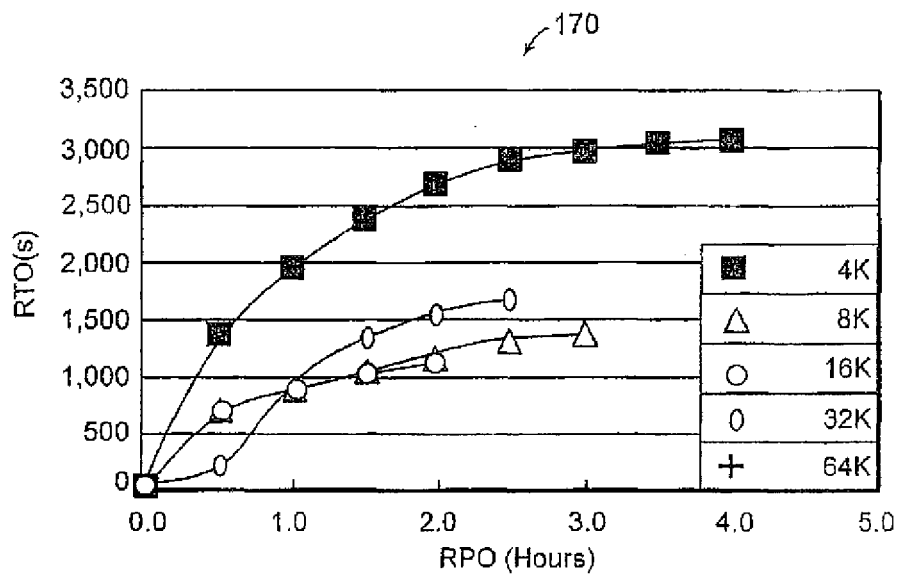
Figure 8:
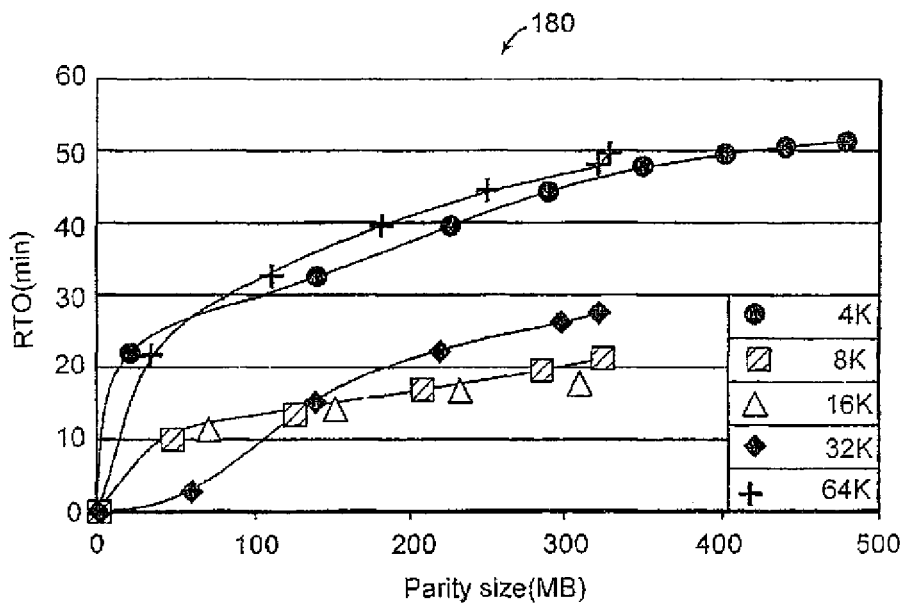
Figure 9:
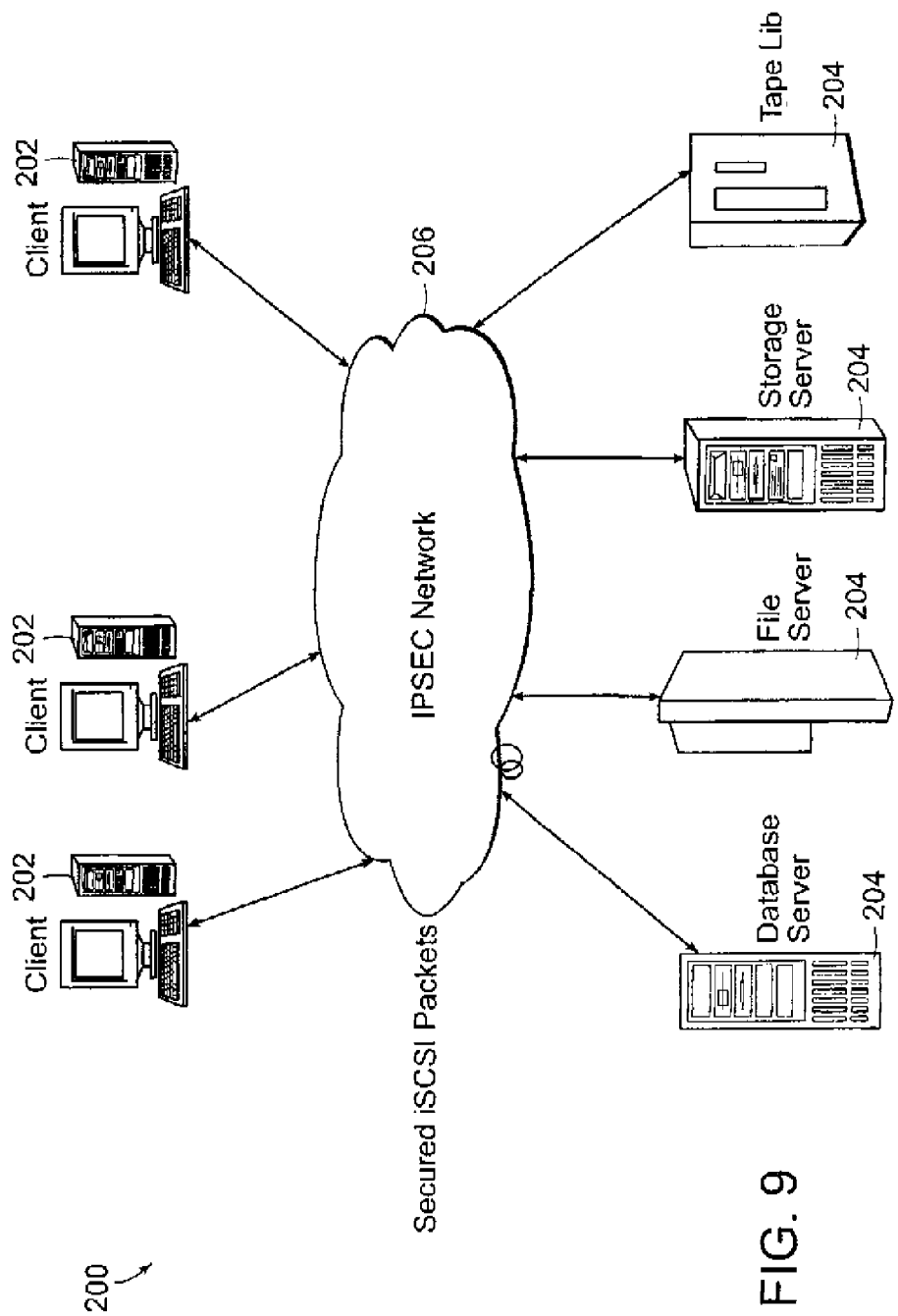
Figure 10:
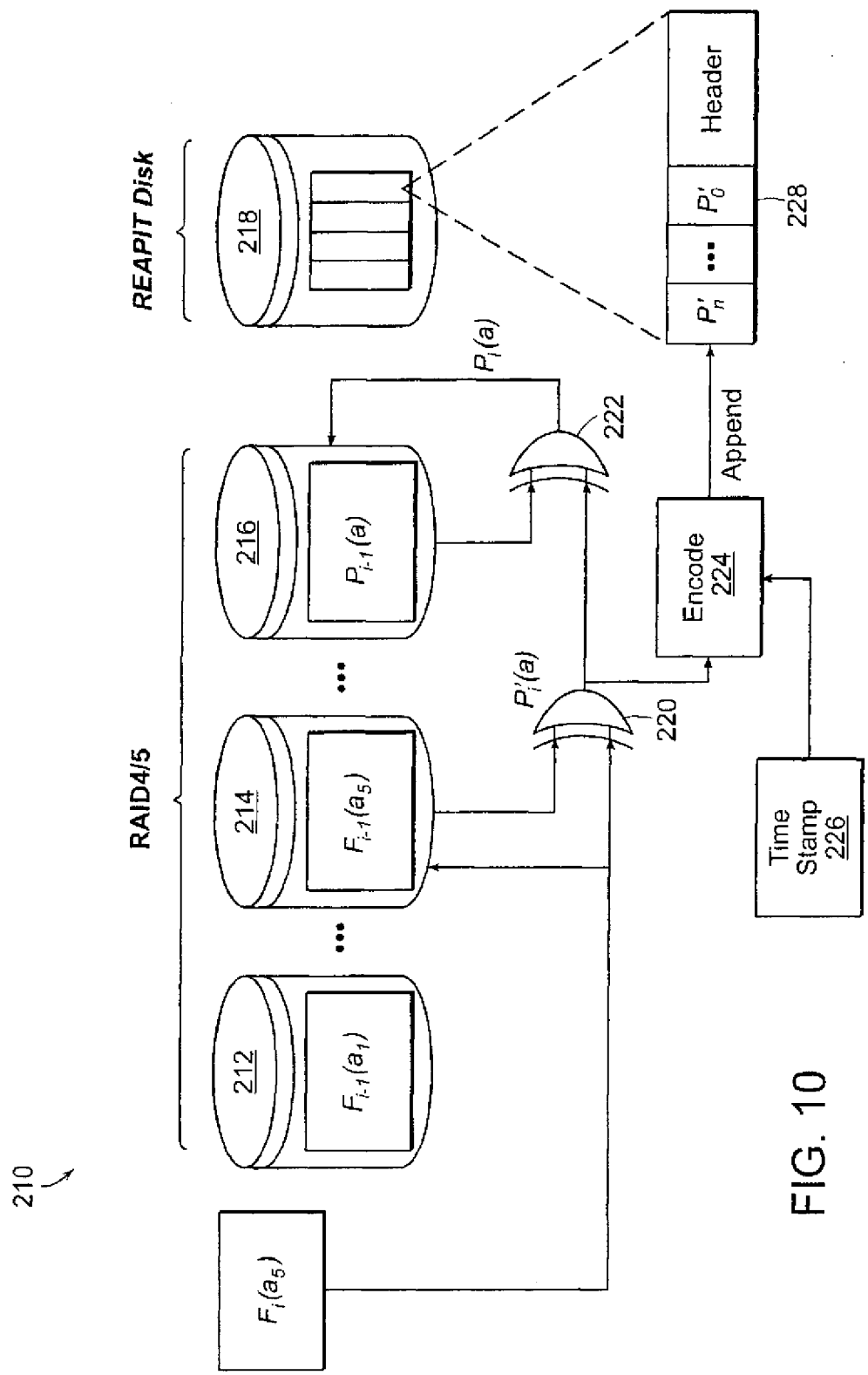
Figure 11:
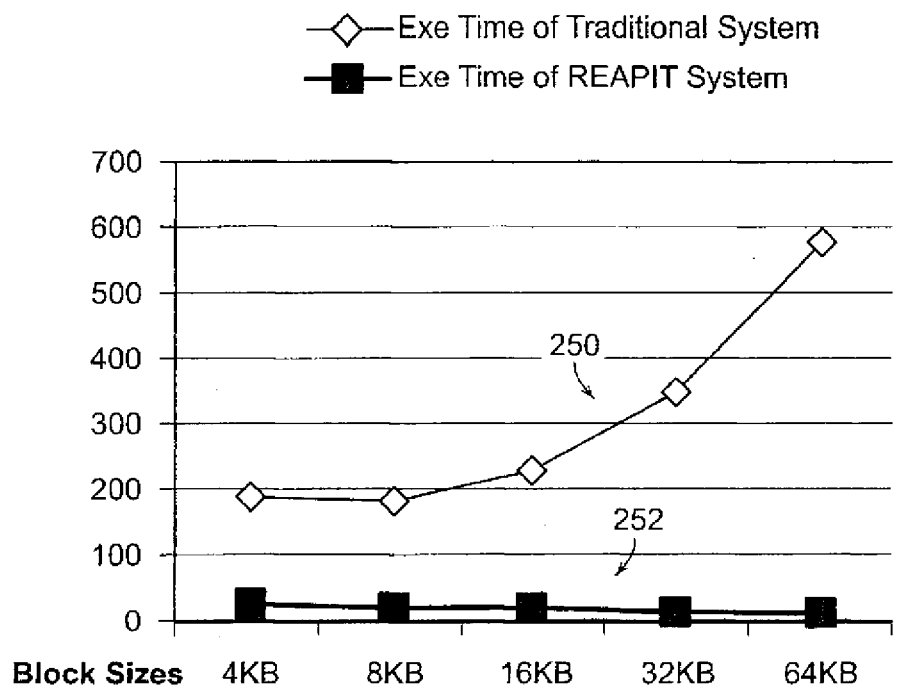
Figure 12:
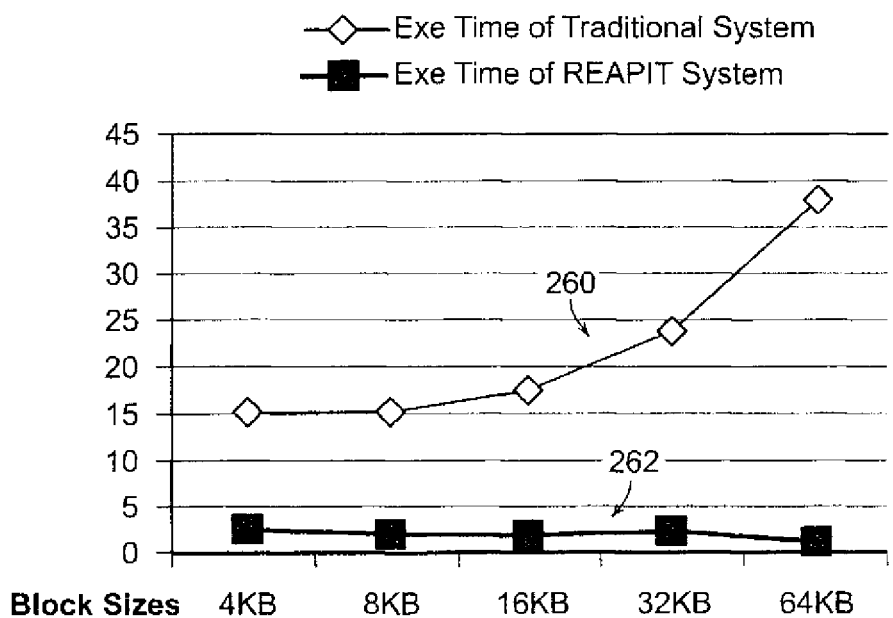
Figure 13:
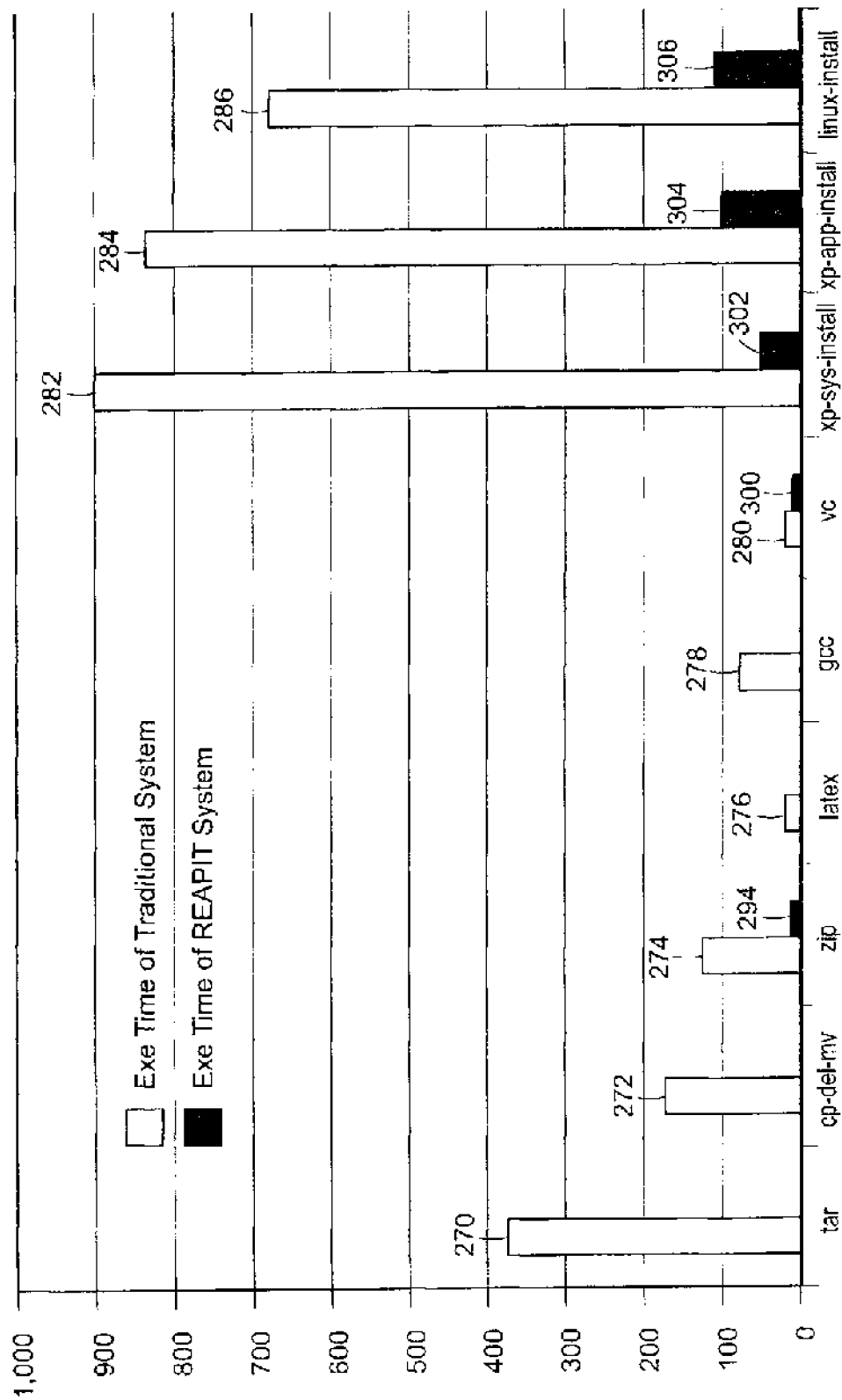

In addition to database applications, many eHealthcare information systems use file systems. In order to see how REAPIT performs on file systems, an experiment on file system benchmarks was carried out as discussed above. These file system micro benchmarks were run and the extra execution time needed to encrypt and transmit history data was measured. FIG. 13 shows at 270, 272, 274, 276, 278, 280, 282, 284, 286 the measured results for different benchmarks for a traditional system, and shows at 294, 300, 302, 304, 306 the measured results for the benchmarks for a REAPIT system in accordance with an embodiment of the invention. Note that for certain benchmarks, no significant time was measured for the REAPIT system. As shown in FIG. 13, REAPIT substantially reduces the execution time. For all benchmarks considered, 2 orders of magnitude performance improvement were observed, indicating the effectiveness of using parity logs to capture history data as opposed to keeping data themselves.

Such data storage architecture systems supporting data replay of electronic records, (e.g., Electronic Health Records) as the records were at any point in time, by capturing parities resulting from data changes, permits users to replay data using simple parity computations. Storing and transmitting parities provide additional security and efficiency compared to data itself. Experimental results have shown orders of magnitude improvements over traditional storages.

Those skilled in the art will appreciate that numerous modifications and variations may be made to the above disclosed embodiments without departing from the spirit and scope of the invention.

What is claimed is:

1. A method of maintaining data comprising the steps of:
providing a plurality of data storage mediums, each comprising a parity bit that provides an indication of the parity of the data in each respective data storage medium, at least one of said data storage mediums providing an exclusive OR function of a parity output bit of the at least one of said plurality of data storage mediums;
encoding data provided by said exclusive OR functionality of said parity output bit to provide encoded data;

time stamping said encoded data with a time stamp circuit that is coupled to said encoded data to provide time stamped encoded data; and providing said time stamped encoded data to a time-retrieval data storage medium.

2. The method as claimed in claim 1, wherein said time stamped encoded data is provided as parity log data.

3. The method as claimed in claim 2, wherein said method further includes the step of determining whether a current parity log exceeds a predetermined size.

4. The method as claimed in claim 1, wherein said method further includes the step of retrieving data that involves identifying a logic block address associated with lost data.

5. The method as claimed in claim 4, wherein said step of retrieving data involves employing at least one of backup data or snapshot data to identify a logic block address associated with data of interest.

6. The method as claimed in claim 5, wherein said data of interest is lost data and wherein said method is employed in a data recovery system.

7. The method as claimed in claim 5, wherein said data of interest is patient data and wherein said method is employed in a distributed electronic healthcare information system.

8. A storage architecture for maintaining data, said storage architecture comprising:

a plurality of data storage mediums, each including a parity bit that provides an indication of the parity of the data in each respective data storage medium, at least one of said data storage mediums providing an exclusive OR function of a parity output bit of the at least one of said plurality of data storage mediums;

an encoder system for encoding data provided by said exclusive OR functionality of said parity output bit to provide encoded data; and a time stamp circuit that is coupled to said encoded data for time stamping said encoded data to provide time stamped encoded data.

9. The storage architecture as claimed in claim 8, wherein said encoded data is provided as a plurality of blocks of parity data that each have a length that depends on the output of the parity output bit of the at least one of said data storage mediums.

10. The storage architecture as claimed in claim 8, wherein said encoder system writes the encoding data to a time-recovery disk.

11. The storage architecture as claimed in claim 10, wherein said encoded data is stored in said time-recovery disk in a plurality of parity logs, each including a header and a footer.

12. The storage architecture as claimed in claim 8, wherein said encoder system determines whether a current parity log exceeds a predetermined size.

13. The storage architecture as claimed in claim 8, wherein said storage architecture further includes retrieval means for retrieving data that involves identifying a logic block address associated with lost data.

14. The storage architecture as claimed in claim 13, wherein said retrieval means further involves employing at least one of backup data or snapshot data to identify the logic block address associated with the lost data.

15. The storage architecture as claimed in claim 8, wherein said data includes distributed electronic healthcare information.

16. A system for maintaining data at prior points in time for later data retrieval, said system comprising:

a plurality of data storage mediums, each comprising a parity output bit that provides an indication of the parity of the data in each respective data storage medium;

a time-retrieval medium in communication with at least one of said data storage mediums; and an encoder system coupled to said parity output bit of at least one of said data storage mediums and coupled to said time-retrieval medium for providing encoded data in a parity log regarding whether a block of data in said at least one data storage medium has been changed.

17. The system as claimed in claim 16, wherein said encoder systems includes a time-stamp circuit that is coupled to said encoded data for time stamping said encoded data to provide time stamped encoded data.

18. The system as claimed in claim 16, wherein said time-retrieval medium provides data recovery in the event of a data storage failure.

19. The system as claimed in claim 16, wherein said time-retrieval medium provides data retrieval in a distributed information system.

20. A system for maintaining data at prior points in time for later data retrieval, said system comprising:

a plurality of data storage mediums, each comprising a parity output bit that provides an indication of the parity of the data in each respective data storage medium;

a time-retrieval medium in communication with at least one of said data storage mediums; and an encoder system coupled to said parity output bit of at least one of said data storage mediums and coupled to said time-retrieval medium for providing encoded data regarding whether a block of data in said at least one data storage medium has been changed, wherein said encoder systems includes a time-stamp circuit that is coupled to said encoded data for time stamping said encoded data to provide time stamped encoded data.

21. The system as claimed in claim 20, wherein said encoding data is provided in a parity log.

22. The system as claimed in claim 20, wherein said time-retrieval medium provides data recovery in the event of a data storage failure.

23. The system as claimed in claim 20, wherein said time-retrieval medium provides data retrieval in a distributed information system.

\* \* \* \* \*

UNITED STATES PATENT AND TRADEMARK OFFICE
CERTIFICATE OF CORRECTION

PATENT NO.        : 8,239,706 B1                                          Page 1 of 12
APPLICATION NO.   : 12/763591
DATED             : August 7, 2012
INVENTOR(S)       : Yang It is certified that error appears in the above-identified patent and that said Letters Patent is hereby corrected as shown below:

On the title page, "10 Drawing Sheets" should read --11 Drawing Sheets--.

On the title page, illustrative figure 4 should be substituted with FIG. 4 on the attached replacement drawing sheets 1-11.

In Column 5, line 46, delete "teens" and replace with "terms".

Signed and Sealed this
Twenty-seventh Day of November, 2012

David J. Kappos
*Director of the United States Patent and Trademark Office*